(12) United States Patent
Akl et al.

(10) Patent No.: US 11,716,659 B2
(45) Date of Patent: Aug. 1, 2023

(54) SELECTING A NEIGHBOR NODE IN A WIRELESS MULTI-HOP NETWORK USING A COST PARAMETER

(71) Applicant: QUALCOMM Incorporated, San Diego, CA (US)

(72) Inventors: Naeem Akl, Somerville, NJ (US); Navid Abedini, Somerset, NJ (US); Junyi Li, Chester, NJ (US); Jianghong Luo, Skillman, NJ (US); Luca Blessent, Whitehouse Station, NJ (US); Karl Georg Hampel, Hoboken, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 16/986,903

(22) Filed: Aug. 6, 2020

(65) Prior Publication Data

US 2021/0051549 A1 Feb. 18, 2021

Related U.S. Application Data

(60) Provisional application No. 62/886,155, filed on Aug. 13, 2019.

(51) Int. Cl.
*H04W 36/08* (2009.01)
*H04W 36/00* (2009.01)

(52) U.S. Cl.
CPC ....... *H04W 36/08* (2013.01); *H04W 36/0058* (2018.08)

(58) Field of Classification Search
CPC ..... H04W 40/02; H04W 40/22; H04W 36/08; H04W 36/30; H04W 36/0058;
(Continued)

(56) References Cited

U.S. PATENT DOCUMENTS

2016/0353397 A1* 12/2016 Jung ..................... H04W 8/005
2017/0041868 A1* 2/2017 Palin ................. H04W 52/0216
(Continued)

FOREIGN PATENT DOCUMENTS

WO    WO-2008105771 A1    9/2008

OTHER PUBLICATIONS

Wu et al., "Cost-aware Handover Decision Algorithm for Cooperative Cellular Relaying Networks", 2008, IEEE, 4 pages (Year: 2008).*

(Continued)

*Primary Examiner* — Quoc Thai N Vu
(74) *Attorney, Agent, or Firm* — Harrity & Harrity, LLP

(57) ABSTRACT

Various aspects of the present disclosure generally relate to wireless communication. In some aspects, a child node in a wireless multi-hop network may receive a cost parameter from a neighbor node in the wireless multi-hop network, wherein the cost parameter indicates a cost, due to an operating mode of the neighbor node, of selecting the neighbor node as a target node for a handover procedure, a cell selection procedure, or a cell reselection procedure. The child node may perform the handover procedure, the cell selection procedure, or the cell reselection procedure based at least in part on the cost parameter. Numerous other aspects are provided.

30 Claims, 17 Drawing Sheets

(58) Field of Classification Search
CPC ... H04W 84/18; H04W 84/047; H04W 88/04; H04W 48/20; H04W 48/12; H04W 36/0061; H04W 36/0077; H04W 48/18; H04W 72/51; H04L 45/122; H04L 45/121; H04L 45/20
See application file for complete search history.

(56) References Cited

U.S. PATENT DOCUMENTS

| | | | | |
|---|---|---|---|---|
| 2018/0063771 | A1* | 3/2018 | Singh | H04B 7/15507 |
| 2019/0394084 | A1* | 12/2019 | Tsai | H04L 43/16 |

OTHER PUBLICATIONS

"3rd Generation Partnership Project; Technical Specification Group Radio Access Network; NR; Study on Integrated Access and Backhaul; (Release 16)", 3GPP Draft, 38874-G00, 3rd Generation Partnership Project (3GPP), Mobile Competence Centre, 650, Route Des Lucioles, F-06921, Sophia-Antipolis Cedex, France, Jan. 11, 2019 (Jan. 11, 2019), XP051576885, pp. 1-111, Retrieved from the Internet: URL: http://www.3gpp.org/ftp/tsg%5Fran/WG2%5FRL2/Specifications/201812%5Ffinal%5Fspecs%5Fafter%5FRAN%5F82/38874%2Dg00%2Ezip, [retrieved on Jan. 11, 2019] Section 9.7, Cited in the Application, Paragraph 6 .1.1 Abstract Section 6.2 IAB Architectures Proposed, p. 13-p. 17 Section 9.7 Topology Adaptation, p. 76-p. 86, 9.2 IAB Topologies, 9.3 Integration of IAB-node, 9.4 Modifications to CU/DU Architecture, 9.4.1 Modifications of IAB-donor/IAB-node, DU and IAB-Donor CU for Architecture Group, 1 72, p. 64-p. 72. Paragraph 7.3.1.
AT&T: "Enhancements to Support NR Backhaul Links," 3GPP Draft, 3GPP TSG RAN WG1 Meeting #94bis, R1-1810690, 3rd Generation Partnership Project (3GPP), Mobile Competence Centre, 650, Route Des Lucioles, F-06921, Sophia-Antipolis Cedex, France, vol. RAN WG1, No. Chengdu, China, Oct. 8, 2018-Oct. 12, 2018, Sep. 29, 2018 (Sep. 29, 2018), XP051518094, 15 pages, Retrieved from the Internet: URL: http://www.3gpp.org/ftp/tsg_ran/WG1_RL1/TSGR1_94b/Docs/R1-1810690.zip [retrieved on Sep. 29, 2018] Chapter 2.3 "Frame Structure Design and Backhaul Multiplexing".
Ericsson: "Summary of 7.2.3.1 Enhancements to Support NR Backhaul Links", 3GPP Draft, 3GPP TSG RAN WG1 Meeting #94bis, R1-1811844, 3rd Generation Partnership Project (3GPP), Mobile Competence Centre, 650, Route Des Lucioles, F-06921 Sophia-Antipolis Cedex, France vol. RAN WG1, No. Chengdu, China, Oct. 8, 2018-Oct. 12, 2018, Oct. 9, 2018, XP051519169, 21 pages, Retrieved from the Internet: URL:http://www.3gpp.org/ftp/tsg%5Fran/WG1%5FRL1/TSGR1%5F94b/Docs/R1%2D1811844%2Ezip [retrieved on Oct. 9, 2018], Chapter 3 "Dynamic Resource Allocation between Backhaul and Access Links".
International Search Report and Written Opinion—PCT/US2020/045411—ISA/EPO—dated Nov. 16, 2020.
Omesh Networks: "Traffic Scenario of Micro-environment Services for SCC," 3GPP Draft, 3GPP TSG-SA WG1 Meeting #85, S1-190010 Microenv, 3rd Generation Partnership Project (3GPP), Mobile Competence Centre, 650, Route Des Lucioles, F-06921, Sophia-Antipolis Cedex, France, vol. SA WG1. No. Tallinn, Estonia, Feb. 18, 2019-Feb. 22, 2019, Feb. 8, 2019 (Feb. 8, 2019), XP051609297, 3 pages, Retrieved from the Internet: URL: http://www.3gpp.org/ftp/tsg%5Fsa/WG1%5FServ/TSGS1%5F85%5FTallin/Docs/S1%2D190010%2Ezip [retrieved on Feb. 8, 2019] paragraph [6.x.3].
Omesh Networks: "Use Case of Micro-environment Services for SCC", 3GPP Draft, 3GPP TSG-SA WG1 Meeting #85, S1-190364, WAS 190010 Microenv RM05, 3rd Generation Partnership Project (3GPP), Mobile Competence Centre, 650, Route Des Lucioles, F-06921, Sophia-Antipolis Cedex, France, vol. SA WG1. No. Tallinn. Estonia, Feb. 18, 2019-Feb. 22, 2019, Feb. 25, 2019 (Feb. 25, 2019), XP051609585, 5 pages, Retrieved from the Internet: URL: http://www.3gpp.org/ftp/tsg%5Fsa/WG1%5FServ/TSGS1%5F85%5FTallin/Docs/S1%2D190364%2Ezip [retrieved on Feb. 25, 2019] paragraph [x.x.6].

\* cited by examiner

SELECTING A NEIGHBOR NODE IN A WIRELESS MULTI-HOP NETWORK USING A COST PARAMETER

CROSS-REFERENCE TO RELATED APPLICATION

This Patent Application claims priority to U.S. Provisional Patent Application No. 62/886,155, filed on Aug. 13, 2019, entitled "SELECTING A NEIGHBOR NODE IN A WIRELESS MULTI-HOP NETWORK USING A COST PARAMETER," and assigned to the assignee hereof. The disclosure of the prior Application is considered part of and is incorporated by reference in this patent Application.

FIELD OF THE DISCLOSURE

Aspects of the present disclosure generally relate to wireless communication and to techniques and apparatuses for selecting a neighbor node in a wireless multi-hop network using a cost parameter.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies.

SUMMARY

In some aspects, a method of wireless communication, performed by a child node in a wireless multi-hop network, may include receiving a cost parameter from a neighbor node in the wireless multi-hop network, wherein the cost parameter indicates a cost, due to an operating mode of the neighbor node, of selecting the neighbor node as a target node for a handover procedure, a cell selection procedure, or a cell reselection procedure; and performing the handover procedure, the cell selection procedure, or the cell reselection procedure based at least in part on the cost parameter.

In some aspects, a method of wireless communication, performed by a serving node in a wireless multi-hop network, may include receiving a cost parameter associated with a neighbor node in the wireless multi-hop network, wherein the cost parameter indicates a cost, due to an operating mode of the neighbor node, of selecting the neighbor node as a target node for a handover procedure; and performing the handover procedure based at least in part on the cost parameter.

In some aspects, a method of wireless communication, performed by a neighbor node in a wireless multi-hop network, may include determining a cost parameter that indicates a cost, due to an operating mode of the neighbor node, of selecting the neighbor node as a target node for a handover procedure, a cell selection procedure, or a cell reselection procedure; and transmitting the cost parameter.

In some aspects, a method of wireless communication, performed by a control node in a wireless multi-hop network, may include receiving a set of cost parameters corresponding to a set of neighbor nodes in the wireless multi-hop network, wherein each cost parameter indicates a cost, due to an operating mode of a respective neighbor node, of selecting the respective neighbor node as a target node for a handover procedure; selecting a neighbor node, of the set of neighbor nodes, as the target node for the handover procedure based at least in part on the set of cost parameters; and instructing the selected neighbor node to perform the handover procedure.

In some aspects, a child node in a wireless multi-hop network for wireless communication may include memory and one or more processors operatively coupled to the memory. The memory and the one or more processors may be configured to receive a cost parameter from a neighbor node in the wireless multi-hop network, wherein the cost parameter indicates a cost, due to an operating mode of the neighbor node, of selecting the neighbor node as a target node for a handover procedure, a cell selection procedure, or a cell reselection procedure; and perform the handover procedure, the cell selection procedure, or the cell reselection procedure based at least in part on the cost parameter.

In some aspects, a serving node in a wireless multi-hop network for wireless communication may include memory and one or more processors operatively coupled to the memory. The memory and the one or more processors may be configured to receive a cost parameter associated with a neighbor node in the wireless multi-hop network, wherein the cost parameter indicates a cost, due to an operating mode of the neighbor node, of selecting the neighbor node as a target node for a handover procedure; and perform the handover procedure based at least in part on the cost parameter.

In some aspects, a neighbor node in a wireless multi-hop network for wireless communication may include memory and one or more processors operatively coupled to the memory. The memory and the one or more processors may be configured to determine a cost parameter that indicates a cost, due to an operating mode of the neighbor node, of selecting the neighbor node as a target node for a handover procedure, a cell selection procedure, or a cell reselection procedure; and transmit the cost parameter.

In some aspects, a control node in a wireless multi-hop network for wireless communication may include memory and one or more processors operatively coupled to the memory. The memory and the one or more processors may be configured to receive a set of cost parameters corresponding to a set of neighbor nodes in the wireless multi-hop network, wherein each cost parameter indicates a cost, due to an operating mode of a respective neighbor node, of selecting the respective neighbor node as a target node for a handover procedure; select a neighbor node, of the set of neighbor nodes, as the target node for the handover procedure based at least in part on the set of cost parameters; and instruct the selected neighbor node to perform the handover procedure.

In some aspects, a non-transitory computer-readable medium may store one or more instructions for wireless communication. The one or more instructions, when executed by one or more processors of a child node in a wireless multi-hop network, may cause the one or more processors to: receive a cost parameter from a neighbor node in the wireless multi-hop network, wherein the cost parameter indicates a cost, due to an operating mode of the neighbor node, of selecting the neighbor node as a target node for a handover procedure, a cell selection procedure, or a cell reselection procedure; and perform the handover procedure, the cell selection procedure, or the cell reselection procedure based at least in part on the cost parameter.

In some aspects, a non-transitory computer-readable medium may store one or more instructions for wireless communication. The one or more instructions, when executed by one or more processors of a serving node in a wireless multi-hop network, may cause the one or more processors to: receive a cost parameter associated with a neighbor node in the wireless multi-hop network, wherein the cost parameter indicates a cost, due to an operating mode of the neighbor node, of selecting the neighbor node as a target node for a handover procedure; and perform the handover procedure based at least in part on the cost parameter.

In some aspects, a non-transitory computer-readable medium may store one or more instructions for wireless communication. The one or more instructions, when executed by one or more processors of a neighbor node in a wireless multi-hop network, may cause the one or more processors to: determine a cost parameter that indicates a cost, due to an operating mode of the neighbor node, of selecting the neighbor node as a target node for a handover procedure, a cell selection procedure, or a cell reselection procedure; and transmit the cost parameter.

In some aspects, a non-transitory computer-readable medium may store one or more instructions for wireless communication. The one or more instructions, when executed by one or more processors of a control node in a wireless multi-hop network, may cause the one or more processors to: receive a set of cost parameters corresponding to a set of neighbor nodes in the wireless multi-hop network, wherein each cost parameter indicates a cost, due to an operating mode of a respective neighbor node, of selecting the respective neighbor node as a target node for a handover procedure; select a neighbor node, of the set of neighbor nodes, as the target node for the handover procedure based at least in part on the set of cost parameters; and instruct the selected neighbor node to perform the handover procedure.

In some aspects, an apparatus for wireless communication may include means for receiving a cost parameter from a neighbor node in the wireless multi-hop network, wherein the cost parameter indicates a cost, due to an operating mode of the neighbor node, of selecting the neighbor node as a target node for a handover procedure, a cell selection procedure, or a cell reselection procedure; and means for performing the handover procedure, the cell selection procedure, or the cell reselection procedure based at least in part on the cost parameter.

In some aspects, an apparatus for wireless communication may include means for receiving a cost parameter associated with a neighbor node in the wireless multi-hop network, wherein the cost parameter indicates a cost, due to an operating mode of the neighbor node, of selecting the neighbor node as a target node for a handover procedure; and means for performing the handover procedure based at least in part on the cost parameter.

In some aspects, an apparatus for wireless communication may include means for determining a cost parameter that indicates a cost, due to an operating mode of the apparatus, of selecting the apparatus as a target node for a handover procedure, a cell selection procedure, or a cell reselection procedure; and means for transmitting the cost parameter.

In some aspects, an apparatus for wireless communication may include means for receiving a set of cost parameters corresponding to a set of neighbor nodes in the wireless multi-hop network, wherein each cost parameter indicates a cost, due to an operating mode of a respective neighbor node, of selecting the respective neighbor node as a target node for a handover procedure; means for selecting a neighbor node, of the set of neighbor nodes, as the target node for the handover procedure based at least in part on the set of cost parameters; and means for instructing the selected neighbor node to perform the handover procedure.

Aspects generally include a method, apparatus, system, computer program product, non-transitory computer-readable medium, user equipment, base station, node, wireless node, child node, parent node, serving node, control node, central unit, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
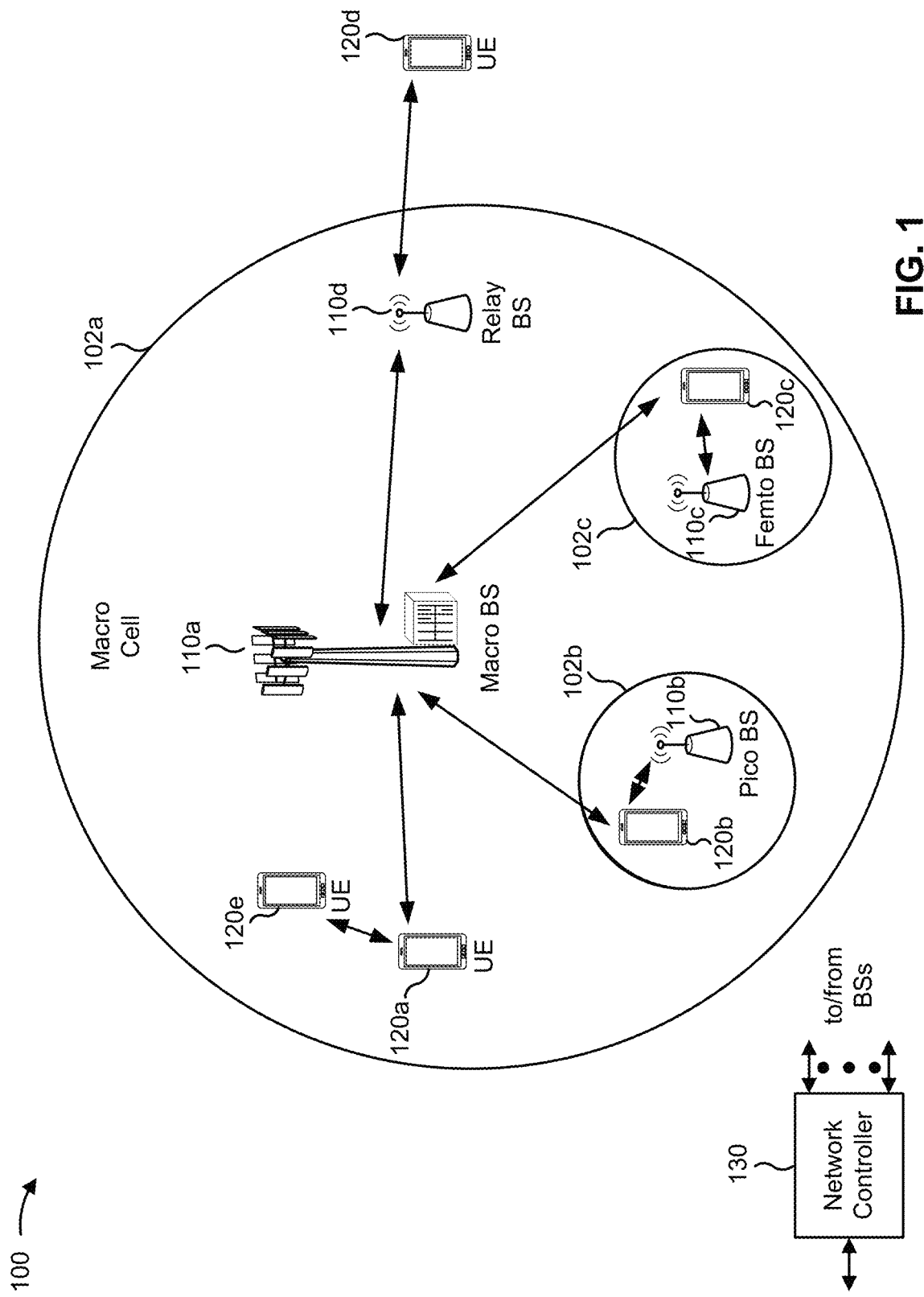
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
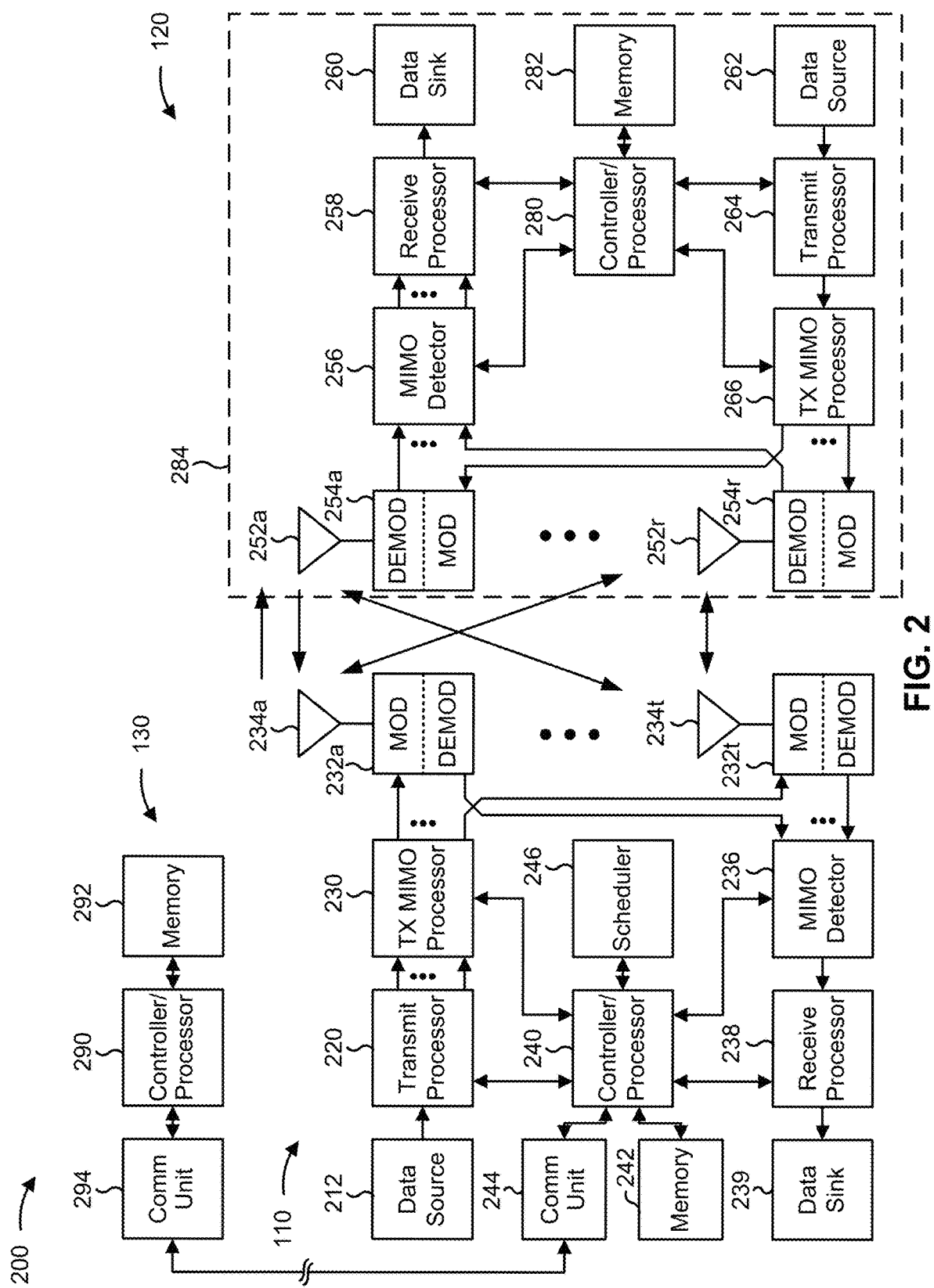
FIG. 2 is a diagram illustrating an example of a base station and a UE in a wireless network, in accordance with various aspects of the present disclosure.

FIG. 2 is a diagram illustrating an example 200 of a base station 110 and a UE 120 in a wireless network, in accordance with various aspects of the present disclosure. The base station 110 and the UE 120 may be one of the base stations and one of the UEs in FIG. 1, respectively. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with selecting a neighbor node in a wireless multi-hop network using a cost parameter, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 1000 of FIG. 10, process 1100 of FIG. 11, process 1200 of FIG. 12, process 1300 of FIG. 13, and/or other processes as described herein. A scheduler 246 may schedule UEs for data transmission on the downlink and/or uplink.

In some aspects, the components described in connection with network controller 130 and/or base station 110 may be included in a central unit (CU) of an IAB donor, the components described in connection with base station 110 may be included in a distributed unit (DU) of an IAB donor and/or an IAB node, and/or the components described in connection with UE 120 may be included in a mobile termination (MT) of an IAB node.

In some aspects, a child node (e.g., an IAB node, a UE 120, and/or the like) in a wireless multi-hop network may include means for receiving a cost parameter from a neighbor node in the wireless multi-hop network, wherein the cost parameter indicates a cost, due to an operating mode of the neighbor node, of selecting the neighbor node as a target node for a handover procedure, a cell selection procedure, or a cell reselection procedure; means for performing the handover procedure, the cell selection procedure, or the cell reselection procedure based at least in part on the cost parameter; and/or the like. In some aspects, such means may include one or more components of UE 120 (which may correspond to an MT of an IAB node) described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a serving node (e.g., an IAB node) in a wireless multi-hop network may include means for receiving a cost parameter associated with a neighbor node in the wireless multi-hop network, wherein the cost parameter indicates a cost, due to an operating mode of the neighbor node, of selecting the neighbor node as a target node for a handover procedure; means for performing the handover procedure based at least in part on the cost parameter; and/or the like. In some aspects, such means may include one or more components of base station 110 (which may correspond to a DU of the IAB node) described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a neighbor node (e.g., an IAB node) in a wireless multi-hop network may include means for determining a cost parameter that indicates a cost, due to an operating mode of the neighbor node, of selecting the neighbor node as a target node for a handover procedure, a cell selection procedure, or a cell reselection procedure; means for transmitting the cost parameter; and/or the like. In some aspects, such means may include one or more components of base station 110 (which may correspond to a DU of the neighbor node) described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a control node (e.g., an IAB donor, an IAB node, and/or the like) in a wireless multi-hop network may include means for receiving a set of cost parameters corresponding to a set of neighbor nodes in the wireless multi-hop network, wherein each cost parameter indicates a cost, due to an operating mode of a respective neighbor node, of selecting the respective neighbor node as a target node for a handover procedure; means for selecting a neighbor node, of the set of neighbor nodes, as the target node for the handover procedure based at least in part on the set of cost parameters; means for instructing the selected neighbor node to perform the handover procedure; and/or the like. In some aspects, such means may include one or more components of base station 110 and/or network controller 130 (one or both of which may correspond to the control node) described in connection with FIG. 2, such as antenna 234, DEMOD 232, MIMO detector 236, receive processor 238, controller/processor 240, transmit processor 220, TX MIMO processor 230, MOD 232, antenna 234, controller/processor 290, memory 292, communication unit 294, and/or the like.

As indicated above, FIG. 2 is provided as an example. Other examples may differ from what is described with regard to FIG. 2.

Figure 3:
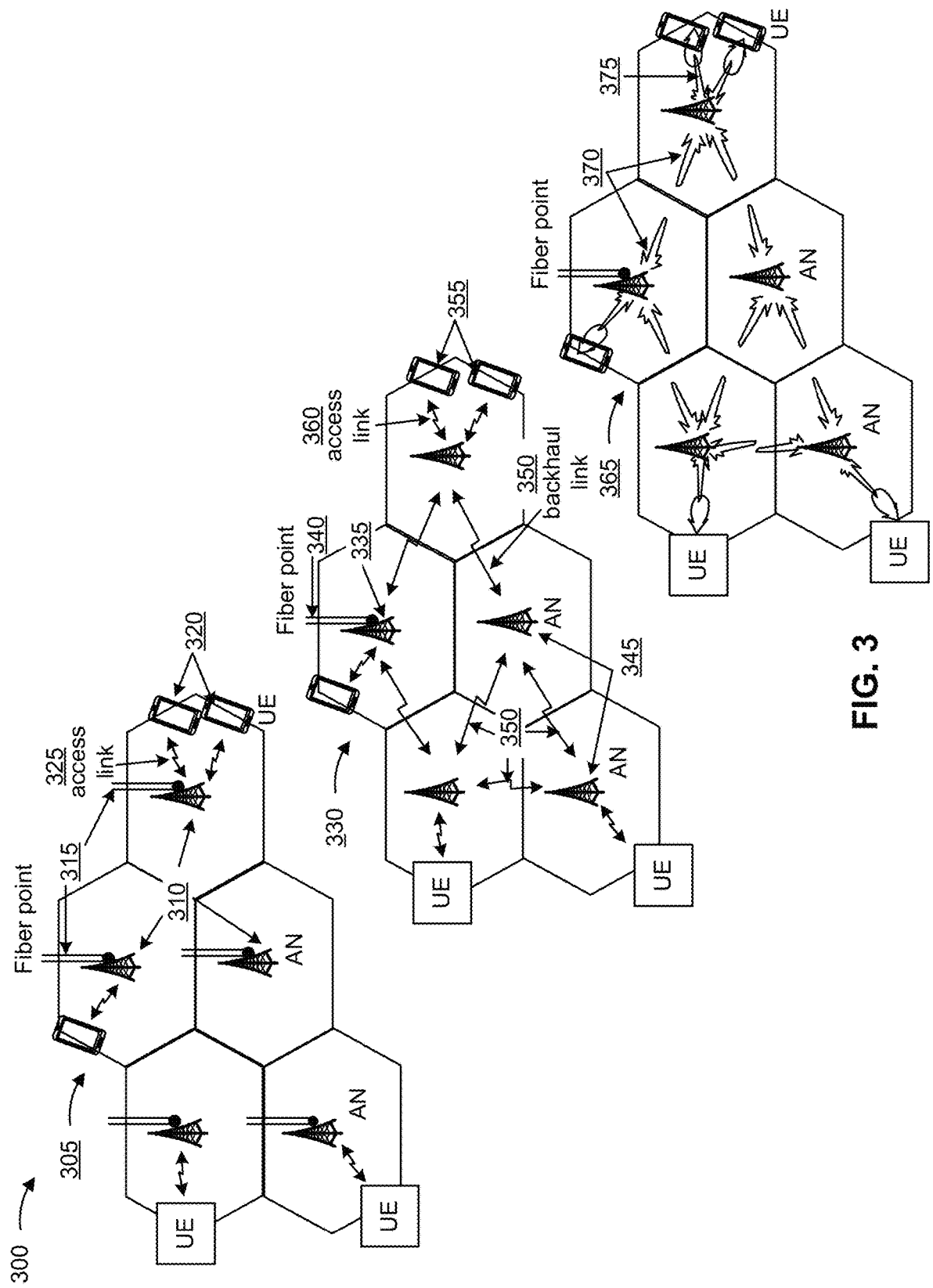
FIG. 3 is a diagram illustrating examples of radio access networks, in accordance with various aspects of the disclosure.

FIG. 3 is a diagram illustrating examples 300 of radio access networks, in accordance with various aspects of the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may correspond to a base station 110 shown in FIG. 1. Similarly, a UE 320 shown in FIG. 3 may correspond to a UE 120 shown in FIG. 1.

As shown by reference number 330, a radio access network may include a wireless backhaul network, sometimes referred to as an integrated access and backhaul (TAB) network. An TAB network is a type of wireless multi-hop network. In an TAB network, at least one base station is an anchor base station 335 that communicates with a core network via a wired backhaul link 340, such as a fiber connection. An anchor base station 335 may also be referred to as an TAB donor (or TAB-donor). The TAB network may include one or more non-anchor base stations 345, sometimes referred to as relay base stations, TAB nodes (or IAB-nodes), and/or the like. The non-anchor base station 345 may communicate directly with or indirectly with (e.g., via one or more non-anchor base stations 345) the anchor base station 335 via one or more backhaul links 350 to form a backhaul path (or route) to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may correspond to a base station 110 shown in FIG. 1. Similarly, a UE 355 shown in FIG. 3 may correspond to a UE 120 shown in FIG. 1.

As shown by reference number 365, in some aspects, a radio access network that includes an TAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links 370 between base stations may use millimeter waves to carry information and/or may be directed toward a target base station using beamforming, precoding, and/or the like. Similarly, the wireless access links 375 between a UE and a base station may use millimeter waves and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network, a device-to-device network, and/or the like). In this case, "anchor node" may refer to a UE that is directly in communication with a base station (e.g., an anchor base station or a non-anchor base station).

As indicated above, FIG. 3 is provided as an example. Other examples may differ from what was described with regard to FIG. 3.

Figure 4:
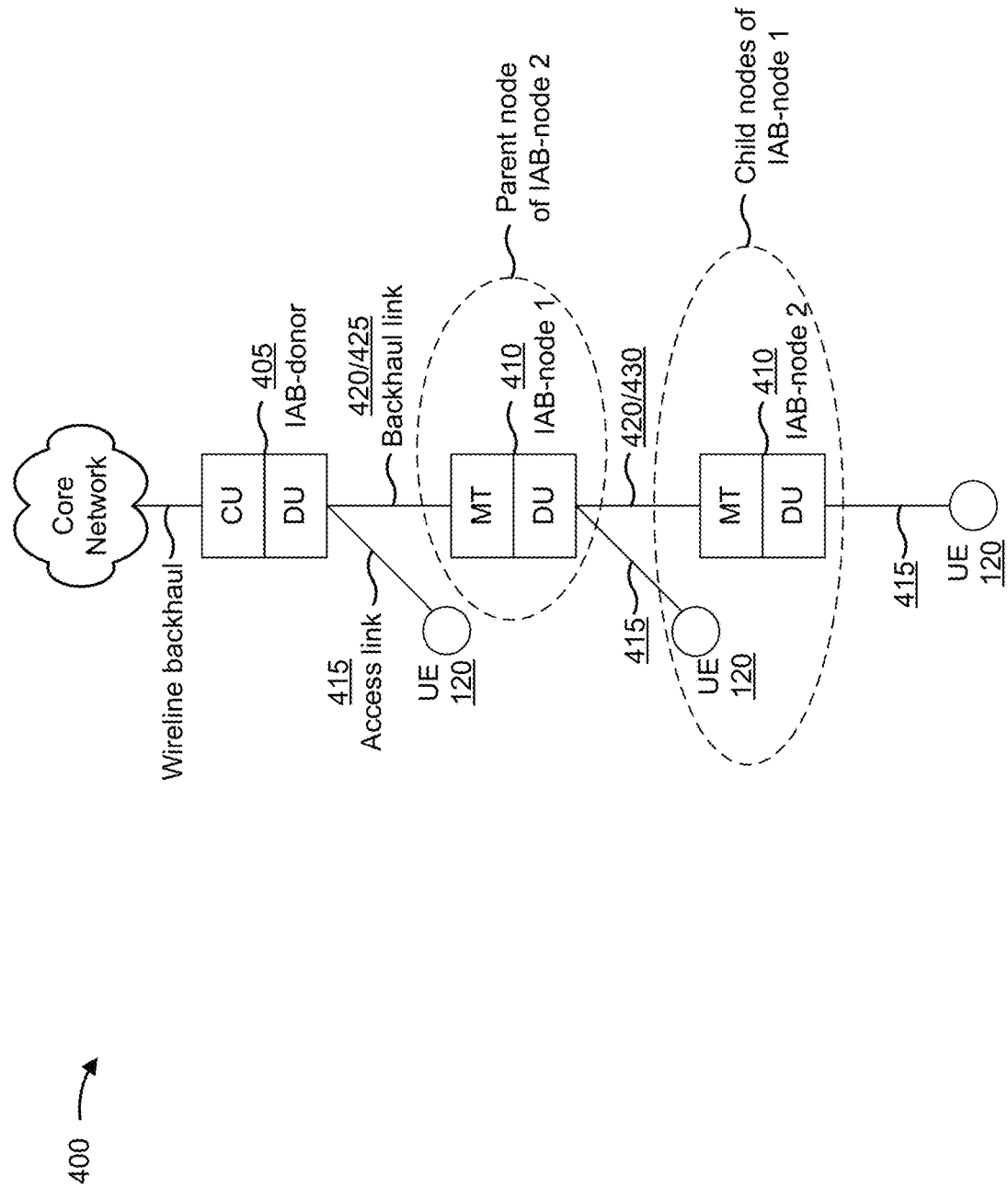
FIG. 4 is a diagram illustrating an example of an integrated access and backhaul (IAB) network architecture, in accordance with various aspects of the present disclosure.

FIG. 4 is a diagram illustrating an example 400 of an IAB network architecture, in accordance with various aspects of the disclosure.

As shown in FIG. 4, an IAB network may include an IAB donor 405 (shown as IAB-donor 405) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide an access and mobility management function (e.g., AMF). In some aspects, an IAB donor 405 may include a base station 110, such as an anchor base station, as described above in connection with FIG. 3. As shown, an IAB donor 405 may include a central unit (CU), which may perform access node controller (ANC) functions, AMF functions, and/or the like. The CU may configure a distributed unit (DU) of the IAB donor 405 and/or may configure one or more IAB nodes 410 (e.g., an MT and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message and/or the like). In some aspects, a control and/or configuration message may be carried via an F1 application protocol (F1-AP) interface.

As further shown in FIG. 4, the IAB network may include IAB nodes 410 (shown as IAB-node 1 and IAB-node 2) that connect to the core network via the IAB donor 405. As shown, an IAB node 410 may include mobile termination (MT) functions (sometimes referred to as UE functions (UEF)), and may include DU functions (sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in FIG. 4 may be referred to as a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In some aspects, a backhaul link 420 may be a primary backhaul link or a secondary backhaul link (e.g., a backup backhaul link). In some aspects, a secondary backhaul link may be used if a primary backhaul link fails, becomes congested, becomes overloaded, and/or the like. As used herein, "node" or "wireless node" may refer to an IAB donor 405 or an IAB node 410.

In an IAB network, network resources for wireless communications (e.g., time resources, frequency resources, spatial resources, and/or the like) may be shared between a parent link 425 of an IAB node 410 (shown as link 420/425 for IAB-node 1) and a child link 430 of the IAB node 410 (shown as link 420/430 for IAB-node 1). When an IAB node 410 uses time division multiplexing (TDM) between a parent link 425 and a child link 430, the IAB node 410 is subject to a half duplex constraint, meaning that the IAB node 410 cannot transmit and receive information at the same time (e.g., cannot concurrently communicate via a parent link 425 of the IAB node 410 and a child link 430 of the IAB node 410). This constraint may lead to high latency for communications.

To reduce latency, increase robustness, and expand coverage of an IAB network, the IAB network may be over-deployed. For example, there may be multiple IAB donors 405 and/or IAB nodes 410 with overlapping coverage, there may be multiple routes from a particular UE 120 and/or IAB node 410 to another IAB node and/or to the IAB donor 405, and/or the like. For example, because millimeter wave communications have high signal attenuation during propagation, IAB nodes 410 with overlapping coverage may be deployed to expand coverage in the IAB network and mitigate such signal attenuation. Furthermore, because millimeter wave communications are susceptible to link blockage and link failure, IAB nodes 410 with overlapping coverage may be deployed to improve robustness of the IAB network.

In an over-deployed IAB network, different IAB nodes 410 may have different operating modes depending on, for example, a number of child nodes and/or UEs 120 served by the IAB node 410, an amount of traffic served by the IAB node 410, a power status of the IAB node 410 (e.g., whether the IAB node 410 is operating using battery power or alternating current (AC) power, a remaining battery life of the IAB node 410, and/or the like), a power saving mode of the IAB node 410, and/or the like. To conserve energy and battery power, an IAB node 410 may enter an operating mode with low energy consumption when network activity (e.g., a number of child nodes and/or UEs 120 to be served, an amount of network traffic, and/or the like) in a coverage area of the IAB node 410 is low and/or if other IAB nodes 410 in that coverage area are capable of handling the network activity. Conversely, if network activity in a coverage area of an IAB node 410 is high and/or if other IAB nodes 410 in that coverage area are not capable of handling the network activity (or are not present in the coverage area), then the IAB node 410 may enter an operating mode with high energy consumption.

During a handover procedure, a UE 120 and/or a child node may be handed over from a serving node (e.g., a first parent node) to a target node (e.g., a second parent node). During a cell selection procedure and/or a cell reselection procedure, a UE 120 and/or a child node may select a target node to serve the UE 120 (e.g., as a serving node). In an over-deployed IAB network, there may be multiple neighbor nodes that satisfy a handover condition (e.g., criteria) and/or a cell selection condition, and that are candidates for the target node. However, the multiple neighbor nodes may have different operating modes, such that selection of a first neighbor node over a second neighbor node provides poorer performance even if the first neighbor node is associated with better parameters (e.g., an RSRP parameter and/or the like) for handover or cell selection as compared to the second neighbor node. For example, the first neighbor node may be in a power saving mode, may be operating using battery power, may have low remaining battery life, may have a long route to an IAB donor 405, and/or the like. In this case, selection of the first neighbor node using traditional procedures and/or parameters for handover or cell selection would result in worse performance than selection of the second neighbor node. Some techniques and apparatuses described herein account for operating modes of neighbor nodes when performing a handover procedure and/or a cell selection procedure (e.g., including a cell reselection procedure), thereby improving performance of the IAB network.

As indicated above, FIG. 4 is provided as an example. Other examples may differ from what is described with regard to FIG. 4.

Figure 5:
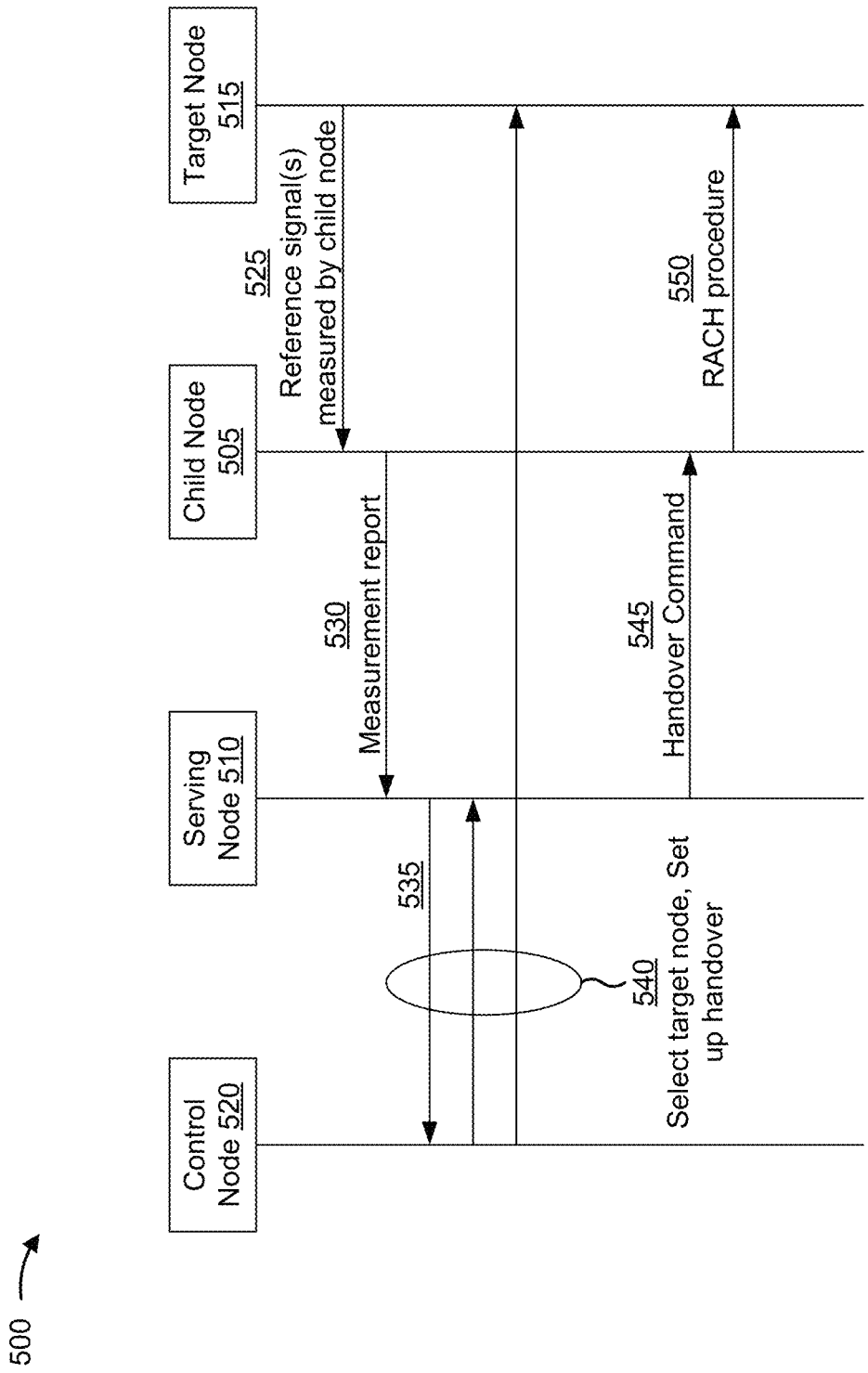
FIG. 5 is a diagram illustrating an example of a handover procedure in an IAB network, in accordance with various aspects of the present disclosure.

FIG. 5 is a diagram illustrating an example 500 of a handover procedure in an IAB network, in accordance with various aspects of the present disclosure.

As shown in FIG. 5, a handover procedure in an IAB network may involve a child node 505 (e.g., a UE, an MT of an IAB node, and/or the like), a serving node 510 that serves the child node 505 prior to handover, a target node 515 (e.g., selected from a set of neighbor nodes) that serves the child node 505 after handover, and a control node 520. The control node 520 may communicate with the serving node 510 and the target node 515 to initiate, set up, and/or otherwise assist in or instruct on the handover procedure. In some aspects, the control node 520 may be the same as the serving node 510 (e.g., operations described herein as being performed by the control node 520 may be performed by the serving node 510). In some aspects, the control node 520 may be a parent node of the serving node 510 and/or a parent node of the target node 515. In some aspects, the control node 520 may be an IAB donor 405 (e.g., a CU of an IAB donor 405).

As shown by reference number 525, the child node 505 may receive one or more reference signals from a set of neighbor nodes including the target node 515. The one or more reference signals may include, for example, one or more synchronization signal blocks (SSBs), one or more synchronization signal (SS) and/or physical broadcast channel (SS/PBCH) blocks, and/or the like. The child node 505 may perform measurements on the received reference signals, such as RSRP measurements, RSRQ measurements, RSSI measurements, signal-to-interference-plus-noise ratio (SINR) measurements, and/or the like.

As shown by reference number 530, the child node 505 may report the measurements of the reference signals of the set of neighbor nodes to the serving node 510, such as in a measurement report. As shown by reference number 535, the serving node 510 may provide the measurement report to the control node 520 responsible for selecting a target node, from the set of neighbor nodes, for handover. As shown by reference number 540, the control node 520 may select the target node 515 (e.g., if a handover condition is satisfied), and may communicate with the serving node 510 and the target node 515 to initiate, set up, and/or otherwise assist in or instruct on the handover procedure.

As shown by reference number 545, the serving node 510 may transmit a handover command to the child node 505. The handover command may indicate the target node 515 to which the child node 505 is to be handed over (e.g., as instructed by the control node 520 to the serving node 510). As shown by reference number 550, the child node 505 may perform a random access channel (RACH) procedure to connect to the target node 515 based at least in part on receiving the handover command that identifies the target node 515. After the handover procedure is complete, the child node 505 may be served by the target node 515 and not the serving node 510.

As indicated above, FIG. 5 is provided as an example. Other examples may differ from what is described with regard to FIG. 5.

Figure 6:
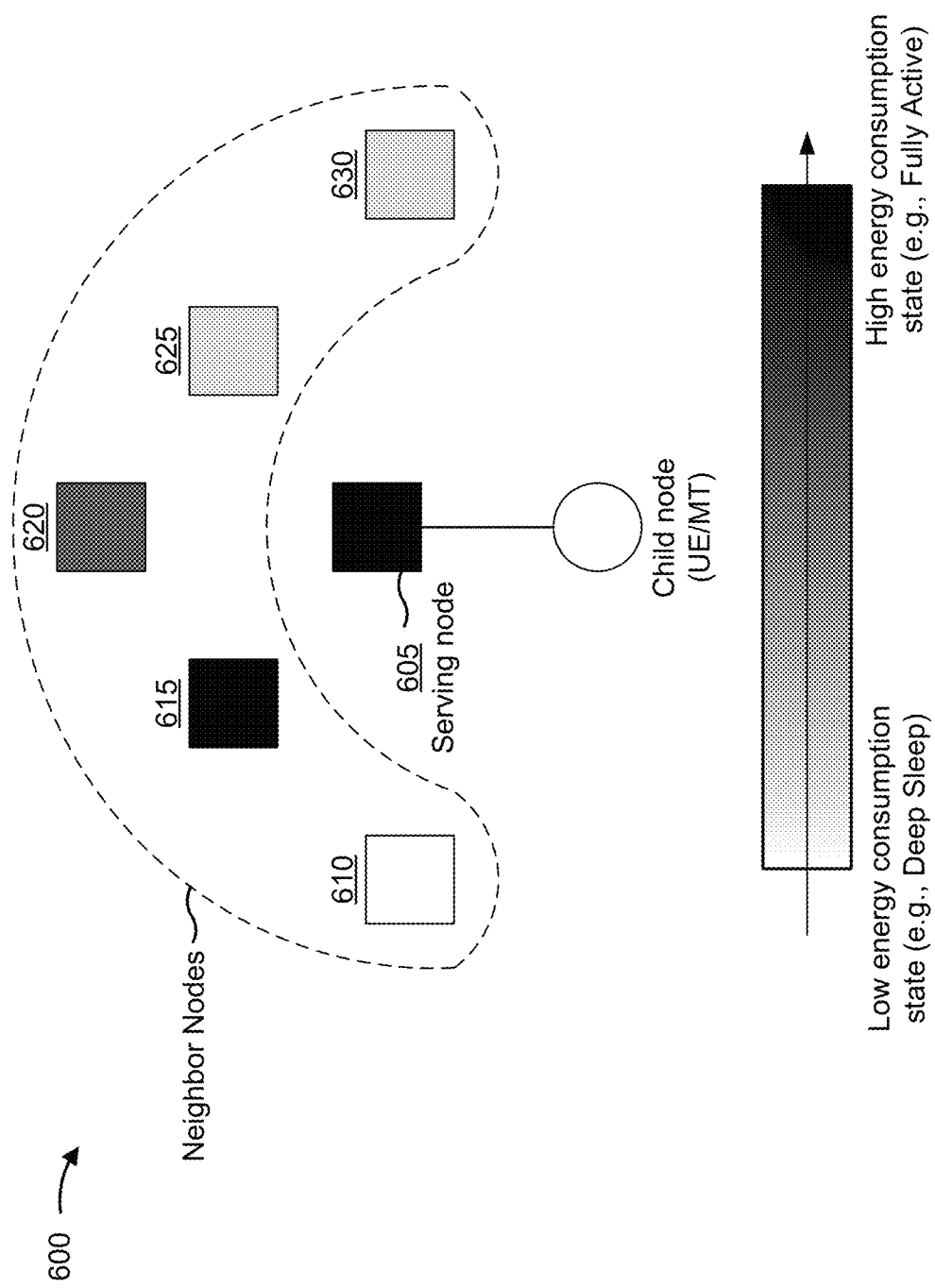
FIG. 6 is a diagram illustrating an example of various operating modes of nodes in an IAB network, in accordance with various aspects of the present disclosure.

FIG. 6 is a diagram illustrating an example 600 of various operating modes of nodes in an IAB network, in accordance with various aspects of the present disclosure.

As shown in FIG. 6, different nodes (e.g., IAB nodes 410) in an IAB network may operate in different operating modes (e.g., at a given point in time). For example, a serving node 605 of a child node (e.g., a UE/MT) may operate in a high energy consumption state. The serving node 605 may operate in the high energy consumption state due to serving a number (e.g., a quantity) of child nodes that satisfies a threshold, due to serving an amount of network traffic that satisfies a threshold, due to being powered by AC power, due to having a remaining amount of battery life that satisfies a threshold, and/or the like. In the high energy consumption state, the serving node 605 may be fully active, may have more features enabled than a node in a lower energy consumption state, may perform one or more operations (e.g., transmissions, reference signal transmissions, paging, and/or the like) more frequently than a node in a lower energy consumption state, and/or the like.

As another example, a first neighbor node 610 may operate in a low energy consumption state. The first neighbor node 610 may operate in the low energy consumption state due to serving a number of child nodes that does not satisfy a threshold, due to serving an amount of network traffic that does not satisfy a threshold, due to being powered by battery power, due to having a remaining amount of battery life that does not satisfy a threshold, and/or the like. In the low energy consumption state, the first neighbor node 610 may be in a deep sleep mode and/or a power saving mode, may have fewer features enabled than a node in a higher energy consumption state, may perform one or more operations (e.g., transmissions, reference signal transmissions, paging, and/or the like) less frequently than a node in a higher energy consumption state, may operate with limited service (e.g., may provide only emergency service), and/or the like. In some aspects, in the low energy consumption state, the first neighbor node 610 may be powered off (e.g., for battery charging).

As further shown in FIG. 6, different neighbor nodes 615, 620, 625, and 630 may operate in different operating modes within a range of operating modes. For example, different operating modes may correspond to serving different numbers of child nodes (e.g., a number of child nodes that falls within a threshold range, that is greater than a threshold, that is less than a threshold, and/or the like), due to serving different amounts of network traffic (e.g., an amount of network traffic that falls within a threshold range, that is greater than a threshold, that is less than a threshold, and/or the like), due to being powered by battery power or by AC power, due to having different amounts of remaining battery life (e.g., an amount of remaining battery life that falls within a threshold range, that is greater than a threshold, that is less than a threshold, and/or the like), due to being in a charging state or not being in a charging state, and/or the like.

In some scenarios, the child node 605 may be handed over from the serving node 610 to one of the neighbor nodes, such as due to mobility of the child node 605 and/or the serving node 610, due to poor link quality between the child node 605 and the serving node 610, due to activation of a power saving mode by the serving node 610, and/or the like. However, as described above, different neighbor nodes may have different operating modes. In this case, selection of a first neighbor node (e.g., neighbor node 610) over a second neighbor node (e.g., neighbor node 615) may provide poorer performance even if the first neighbor node is associated with better parameters (e.g., an RSRP parameter and/or the like) for handover as compared to the second neighbor node. In this case, selection of the first neighbor node using traditional procedures and/or parameters for handover or cell selection would result in worse performance than selection of the second neighbor node. Some techniques and apparatuses described herein account for operating modes of neighbor nodes when performing a handover procedure, thereby improving performance of the IAB network. Similarly, some techniques and apparatuses described herein account for operating modes of neighbor nodes when performing a cell selection procedure (e.g., including a cell reselection procedure), thereby improving performance of the IAB network.

As indicated above, FIG. 6 is provided as an example. Other examples may differ from what is described with regard to FIG. 6.

Figure 7:
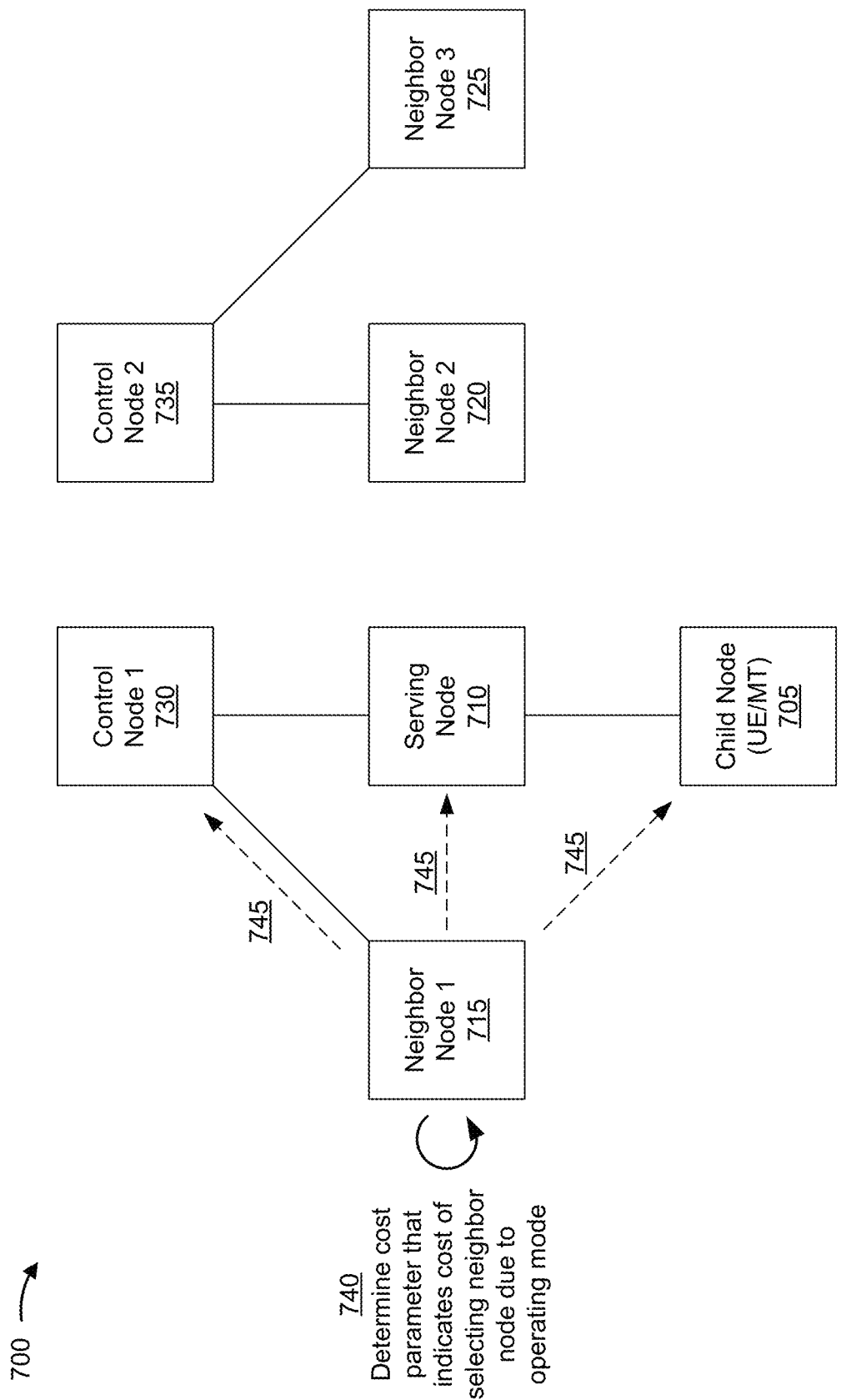
FIGS. 7-9 are diagrams illustrating examples of selecting a neighbor node in a wireless multi-hop network using a cost parameter, in accordance with various aspects of the present disclosure.

FIG. 7 is a diagram illustrating an example 700 of selecting a neighbor node in a wireless multi-hop network using a cost parameter, in accordance with various aspects of the present disclosure.

As shown in FIG. 7, a child node 705 (e.g., a UE, an MT of an IAB node 410, and/or the like) may be served by a serving node 710 (e.g., a parent node). The child node 705 may receive reference signals from a set of neighbor nodes, shown as a first neighbor node 715, a second neighbor node 720, and a third neighbor node 725. The serving node and the first neighbor node 715 may be controlled by a first control node 730. The second neighbor node 720 and the third neighbor node 725 may be controlled by a second control node 735.

The nodes of FIG. 7 may correspond to nodes of the same name described above in connection with FIG. 5. Thus, as described above in connection with FIG. 5, the child node 705 may include a UE, an MT of an IAB node, and/or the like. The serving node 710 may include an IAB node 410 (e.g., having a DU function for scheduling communications with the child node 705), an IAB donor 405 (e.g., having a CU), a parent node of the child node 705, and/or the like.

The first control node 730 may be the same as the serving node 710 (e.g., operations described herein as being performed by the first control node 730 may be performed by the serving node 710), may be a parent node of the serving node 710 (and/or of the first neighbor node 715), and/or may be an IAB donor 405 (e.g., a CU of an IAB donor 405). Similarly, the second control node 735 may be integrated into one of the second neighbor node 720 or the third neighbor node 725, may be a parent node of one or both of the second neighbor node 720 or the third neighbor node 725, and/or may be an IAB donor 405 (e.g., a CU of an IAB donor 405).

As shown by reference number 740, the first neighbor node 715 may determine a cost parameter that indicates a cost of selecting the first neighbor node 715 due to an operating mode of the first neighbor node 715. The cost of selecting the first neighbor node 715 may include a cost of selecting the first neighbor node 715 for a handover procedure, a cost of selecting the first neighbor node 715 for a cell selection procedure, a cost of selecting the first neighbor node 715 for a cell reselection procedure, and/or the like. "Cost of selection" may refer to a penalty associated with such selection, and may be compared to one or more costs corresponding to one or more other node to determine a node to be selected.

In some aspects, a cost parameter for a node may indicate and/or may be determined based at least in part on an operating mode of the node. As described above in connection with FIG. 6, an operating mode may indicate an energy consumption state of a node. The energy consumption state may be based at least in part on a number of child nodes served by the node, an amount of network traffic served by or processed by the node, a number of features enabled for the node, a frequency with which one or more operations (e.g., transmissions, reference signal transmissions, paging, and/or the like) are performed by the node, and/or the like. In some aspects, a higher cost may be associated with selecting a node in a low energy consumption state as compared to a medium energy consumption state because the node may be required to exit a power consumption state and/or serve a small number of child nodes (e.g., thereby causing inefficiencies). In some aspects, a higher cost may be associated with selecting a node in a high energy consumption state as compared to a medium energy consumption state because the node may become overloaded with traffic (e.g., thereby increasing latency, reducing reliability, and/or the like).

Additionally, or alternatively, the cost parameter for a node may indicate and/or may be determined based at least in part on a power status of the node. For example, the power status for a node may indicate whether the node is powered by AC power or battery power, a remaining amount of battery life of the node (e.g., if powered by battery power), whether a battery of the node is being charged, a rate at which the battery of the node is being charged, and/or the like. In some aspects, a higher cost may be associated with selecting a node that is powered by battery power as compared to AC power because child nodes that select a node on battery power may later need to select another node (e.g., if the battery power becomes low). Similarly, a higher cost may be associated with selecting a node that has a shorter battery life as compared to a longer battery life, selecting a node with a battery that is not being charged as compared to a battery that is being charged, selecting a node with a battery that is being charged at a low rate as compared to a high rate, and/or the like.

Additionally, or alternatively, the cost parameter for a node may indicate and/or may be determined based at least in part on a hop count associated with the node. A hop count may indicate a number of hops (e.g., a number of links between nodes) from the node to an IAB donor 405. In some aspects, a higher cost may be associated with selecting a node that has a high hop count as compared to a low hop count because selecting the node with the high hop count may increase latency.

Additionally, or alternatively, the cost parameter for a node may indicate and/or may be determined based at least in part on a time at which the node is available to serve a child node. For example, a higher cost may be associated with selecting a node that is not immediately available to serve a child node as compared to another node that is immediately available, because selecting the node that is not immediately available may increase latency. Similarly, a higher cost may be associated with selecting a node that is not available to serve a child node until later in time as compared to another node that is available to serve the child node earlier in time.

Additionally, or alternatively, the cost parameter for a node may indicate and/or may be determined based at least in part on a priority of selecting the node as compared to one or more other nodes. For example, an IAB donor 405 (e.g., a CU) may configure a set of nodes in the IAB network with a corresponding set of priorities. In some aspects, the IAB donor 405 may determine a priority for a node based at least in part on one or more of the factors described above in connection with determining a cost parameter for a node. For example, a node may indicate one or more of these factors to the IAB donor 405, and/or the IAB donor 405 may configure one or more of these factors for the node. In some aspects, the IAB donor 405 may determine a cost parameter for the node, and may transmit an indication of the cost parameter to the node. Alternatively, a node may determine a cost parameter for the node, and/or may transmit the cost parameter to the IAB donor (e.g., a CU, such as via an F1-AP interface). As an example, a priority of a node may indicate that the node is to be selected as a target node only if no other nodes are available to act as a target node and/or if no other nodes are detected by the child node 705.

Additionally, or alternatively, the cost parameter for a node may indicate and/or may be determined based at least in part on one or more cost parameters (and/or one or more factors described above for determining a cost parameter) for one or more nodes included in a route from the node to an IAB donor 405. Thus, the cost parameter for a node may depend on an operating mode of the node and one or more operating modes corresponding to one or more nodes included in a route from the node to an IAB donor 405.

As shown by reference number 745, the first neighbor node 715 may transmit the cost parameter. As shown, the first neighbor node 715 may transmit the cost parameter to the child node 705, to the serving node 710, and/or to the control node 730. In some aspects, the first neighbor node 715 may transmit the cost parameter in a broadcast message so that a single transmission by the first neighbor node 715 can be received by multiple nodes. For example, the first neighbor node 715 may transmit the cost parameter via a synchronization signal block (SSB), a physical broadcast channel (PBCH), an SS/PBCH block, a system information block (SIB), remaining minimum system information (RMSI), a channel state information reference signal (CSI-RS), another type of reference signal, and/or the like.

In some aspects, the first neighbor node 715 may transmit the cost parameter based at least in part on determining that the operating mode of the first neighbor node satisfies a condition. For example, one or more operating modes may be defined as default operating modes, and other nodes in the IAB network may assume that a neighbor node is operating in a default operating mode unless a cost parameter is received from the neighbor node. For example, a node may transmit the cost parameter if the cost parameter is greater than or equal to a threshold (e.g., indicating a high cost of selecting the node). In this way, network overhead associated with signaling the cost parameter may be reduced. In some aspects, a node may transmit the cost parameter regardless of an operating mode of the node.

In some aspects, a node may periodically update (e.g., determine or redetermine) the cost parameter, and/or may periodically transmit the cost parameter. Additionally, or alternatively, the node may update and/or transmit the cost parameter based at least in part on detecting an event. The event may include, for example, a change in the operating mode of the node (e.g., to a different state, by a threshold amount, and/or the like), a change in the cost parameter (e.g., by a threshold amount), a change in an operating mode and/or a cost parameter of another node associated with the node (e.g., a parent node of the node, a node included in a route to an IAB donor 405, and/or the like), a change in a power status of the node or of another node associated with the node (e.g., a parent node of the node, a node included in a route to an IAB donor 405, and/or the like), a change in network topology (e.g., a change in a combination of nodes included in a route to an IAB donor 405, a change in an IAB donor 405 that configures the node, a change in a hop count from the node to the IAB donor 405, and/or the like), and/or the like.

In FIG. 7, the first neighbor node 715 is shown as determining and transmitting a cost parameter associated with the first neighbor node 715. Similarly, the second neighbor node 720 may determine and transmit a cost parameter associated with the second neighbor node 720, the third neighbor node 725 may determine and transmit a cost parameter associated with the third neighbor node 725, and so on. In this way, the child node 705, the serving node 710, and/or the control nodes 730, 735 may account for operating modes of neighbor nodes when performing a handover procedure and/or a cell selection procedure (e.g., including a cell reselection procedure), thereby improving performance of the IAB network.

As indicated above, FIG. 7 is provided as an example. Other examples may differ from what is described with regard to FIG. 7.

Figure 8:
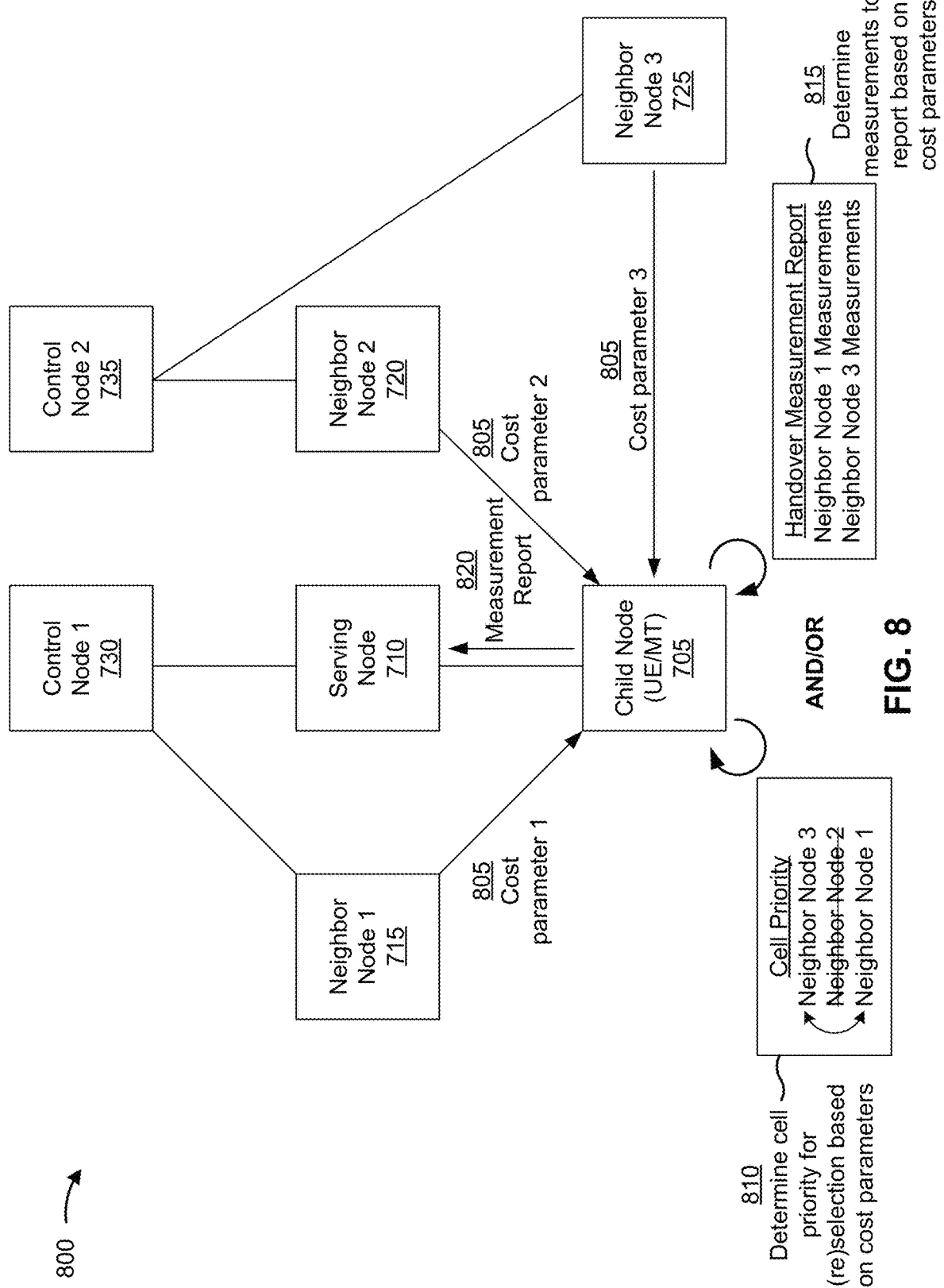

FIG. 8 is a diagram illustrating an example 800 of selecting a neighbor node in a wireless multi-hop network using a cost parameter, in accordance with various aspects of the present disclosure.

As shown by reference number 805, a child node 705 may receive a cost parameter from one or more neighbor nodes in a wireless multi-hop network (e.g., an IAB network), as described above in connection with FIG. 7. Continuing with example 700 of FIG. 7, the child node 705 is shown as receiving a first cost parameter from the first neighbor node 715, receiving a second cost parameter from the second neighbor node 720, and receiving a third cost parameter from the third neighbor node 725. As described above, the cost parameter for a node may indicate a cost, due to an operating mode of the node, of selecting the node as a target node for a handover procedure, a cell selection procedure, and/or a cell reselection procedure. The child node 705 may perform the handover procedure, the cell selection procedure, or the cell reselection procedure based at least in part on a cost parameter received from a neighbor node (or a set of cost parameters received from a set of neighbor nodes). In example 800, the child node 705 may perform the handover procedure, the cell selection procedure, or the cell reselection procedure based at least in part on the first cost parameter, the second cost parameter, and the third cost parameter.

As shown by reference number 810, for a cell selection (or a cell reselection) procedure, the child node 705 may determine a cell priority for cell selection (or cell reselection) based at least in part on a cost parameter. For example, the child node 705 may store a cell priority list that prioritizes cells (e.g., of nodes) for selection, with a higher priority cell being indicated higher or earlier in the list. When performing cell selection or reselection, the child node 705 may attempt to connect to cells in the order indicated in the cell priority list. For example, the child node 705 may attempt to connect to a highest priority cell first. If the connection attempt fails, then the child node 705 may attempt to connect to a second-high priority cell, and so on.

In some aspects, the child node 705 may remove a node (e.g., a cell associated with the node) from the cell priority list if a cost parameter for the node fails to satisfy a condition. For example, the child node 705 may remove a node from the cell priority list if the node is associated with a cost parameter that indicates a cost that is greater than a threshold. In example 800, this is shown as removing the second neighbor node 720 from the cell priority list.

Additionally, or alternatively, the child node 705 may modify a priority of a node and/or a relative priority between nodes based at least in part on respective cost parameters of those nodes. In example 800, the third neighbor node 725 has a better RSRP parameter than the first neighbor node 715, so the third neighbor node 725 would normally have a higher priority than the first neighbor node 715. However, the first neighbor node 715 is associated with a better cost parameter than the third neighbor node 725, so the child node 705 is shown as switching a relative priority of the first neighbor node 715 and the third neighbor node 725 to prioritize the first neighbor node 715 over the third neighbor node 725.

In some aspects, the child node 705 may prioritize nodes in the cell priority list in a measurement first, cost second manner. In this case, nodes with better measurement parameters may generally have a higher priority than nodes with worse measurement parameters, and nodes with the same (or similar, within a threshold) measurement parameter may be prioritized by assigning a higher priority to lower cost nodes as compared to higher cost nodes. Alternatively, the child node 705 may prioritize nodes in the cell priority list in a cost first, measurement second manner. In this case, nodes with lower cost may generally have a higher priority than nodes with a higher cost, and nodes with the same (or similar, within a threshold) cost parameter may be prioritized by assigning a higher priority to nodes with a better measurement parameter as compared to nodes with a worse measurement parameter. In some aspects, the child node 705 may take both a cost parameter and a measurement parameter into account when prioritizing nodes for selection (e.g., using a function).

In some aspects, the child node 705 may determine the cell priority based at least in part on a service type of a communication to be transmitted or received by the child node 705. For example, for a high priority communication (e.g., an ultra-reliable low latency communication (URLLC)), the child node 705 may determine the cell priority to prioritize cells capable of providing lower latency and/or higher reliability service. For example, the child node 705 may prioritize a first cell with a lower hop count over a second cell with a higher hop count to reduce latency. The service type may include, for example, URLLC or enhanced mobile broadband (eMBB).

As shown by reference number 815, for a handover procedure, the child node 705 may perform and/or report measurements based at least in part on a cost parameter. For example, the child node 705 may transmit, to the serving node 710, a measurement report based at least in part on a cost parameter from a neighbor node and/or a set of cost parameters from a set of neighbor nodes. In some aspects, if a measurement for a node is included in the measurement report, then the child node 705 may report a cost parameter for that node (e.g., in the measurement report or in another message separate from the measurement report). However, in some cases, the serving node 710 may receive a cost parameter directly from a neighbor node (as described above in connection with FIG. 7), and the cost parameter may be excluded from the measurement report to reduce signaling overhead.

In some aspects, the child node 705 may report measurements for all neighbor cells and/or for all neighbor cells for which a measurement satisfied a condition. In this case, the child node 705 may not filter measurements for neighbor nodes using respective cost parameters to exclude those measurements from the measurement report. In this case, such filtering may be performed by the serving node 710 and/or a control node, as described in more detail below in connection with FIG. 9.

However, in some aspects, the child node 705 may exclude a measurement for a first node from the measurement report if a cost parameter for the first node fails to satisfy a condition, and may include a measurement for a second node in the measurement report if a cost parameter for the second node satisfies a condition. For example, the child node 705 may exclude a measurement for a node if a cost parameter for the node indicates that a cost of selecting the node is greater than or equal to a threshold cost. Similarly, the child node 705 may include a measurement for a node if a cost parameter for the node indicates that a cost of selecting the node is less than or equal to a threshold cost. By excluding measurements of high cost nodes from the measurement report, the child node 705 may ensure that a high cost node is not selected for a handover procedure, thereby improving performance of the IAB network.

As indicated above, FIG. 8 is provided as an example. Other examples may differ from what is described with regard to FIG. 8.

Figure 9:
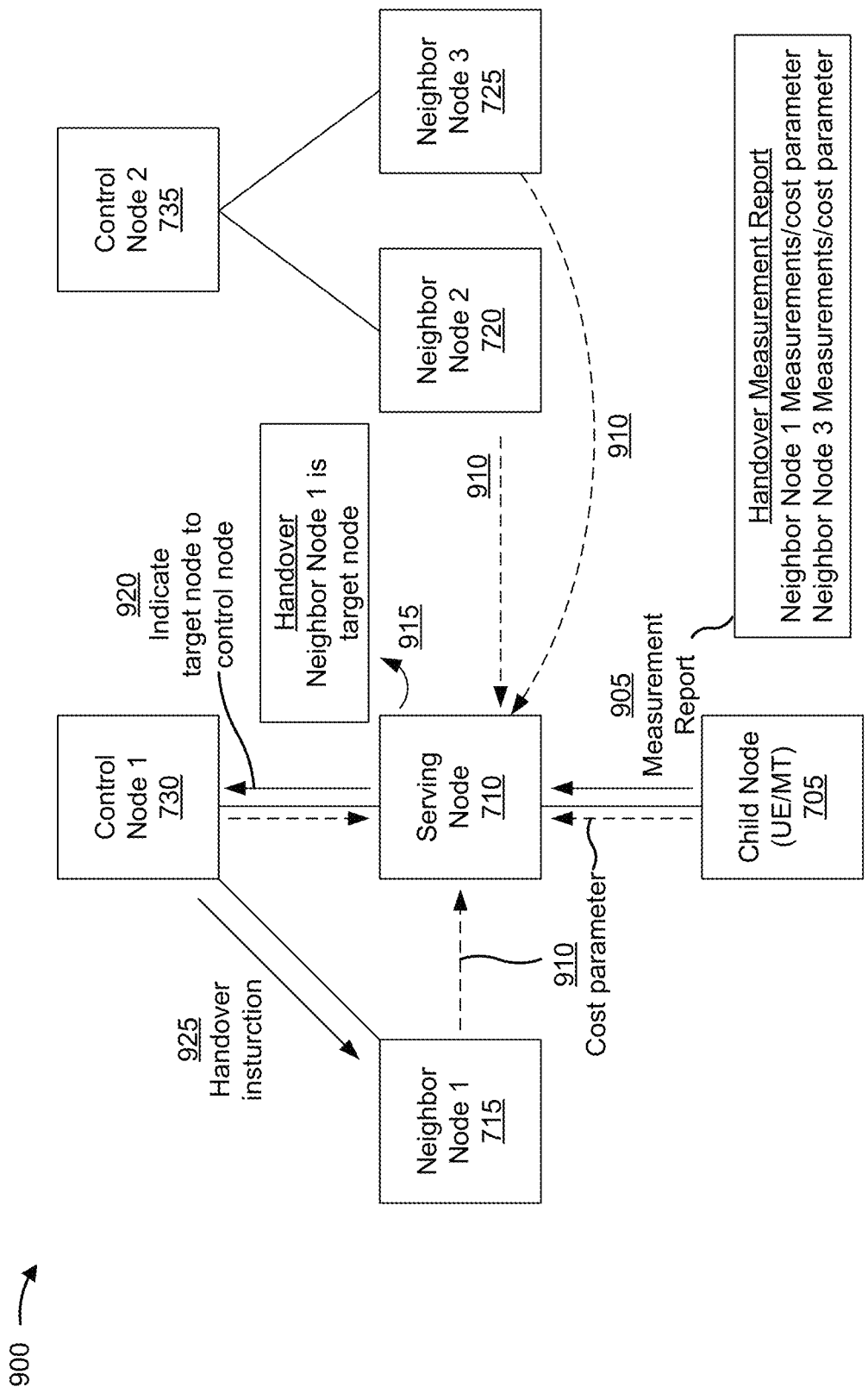

FIG. 9 is a diagram illustrating an example 900 of selecting a neighbor node in a wireless multi-hop network using a cost parameter, in accordance with various aspects of the present disclosure.

As shown by reference number 905, a serving node 710 may receive a measurement report from a child node 705 in a wireless multi-hop network, as described above in connection with FIG. 8. As shown by reference number 910, the serving node 710 may receive one or more cost parameters corresponding to one or more neighbor nodes in the wireless multi-hop network. As described above, a cost parameter of a neighbor node may indicate a cost, due to an operating mode of the neighbor node, of selecting the neighbor node as a target node for a handover procedure. As described above in connection with FIG. 8, in some aspects, the serving node 710 may receive the cost parameter from the child node 705, such as in the measurement report or a message associated with the measurement report. Additionally, or alternatively, as described above in connection with FIG. 7, the serving node 710 may receive the cost parameter for a neighbor node from the neighbor node.

As shown by reference number 915, the serving node 710 may perform a handover procedure based at least in part on the cost parameter and the measurement report. In some aspects, the serving node 710 is responsible for controlling the handover procedure (e.g., the serving node 710 may act as a control node). In this case, the serving node 710 may select a neighbor node, from a set of neighbor nodes indicated in the measurement report, based at least in part on a set of cost parameters corresponding to the set of neighbor nodes. For example, the serving node may select a neighbor node, from a set of neighbor nodes for which corresponding measurements satisfy a condition, with the best cost parameter (e.g., indicating the lowest cost of selection). Additionally, or alternatively, the serving node 710 may calculate a selection value for each neighbor node indicated in the measurement report (e.g., for which a corresponding measurement satisfies a condition) based at least in part on a respective cost parameter and a respective measurement for that neighbor node. The serving node 710 may then select the neighbor node with the best selection value as the target node for handover. In example 900, the serving node 710 determines that the first neighbor node 715 is the target node.

As shown by reference number 920, the serving node 710 may indicate the selected neighbor node (e.g., the target node) to a control node (shown as a first control node 730), which may include the serving node 710, another node in the IAB network (e.g., a parent node of the serving node 710 or a node included in a route from the serving node 710 to a CU of the serving node 710), a CU that configures the serving node 710, and/or the like. In example 900, the serving node 710 performs an analysis to select a target node, and indicates the target node to the control node. However, in some aspects, the serving node 710 may forward cost parameters and measurements for the set of neighbor nodes to the control node, and the control node may perform the analysis to identify the target node.

As shown by reference number 925, the control node may instruct the target node (in example 900, the first neighbor node 715) to perform the handover procedure. Based at least in part on the instruction, the target node may prepare for handover of the child node 705 from the serving node 710 to the target node. In some aspects, after the child node 705 is handed over from the serving node 710 to the target node, the serving node 710 and/or the target node may modify respective operating modes. For example, the target node may transition from a higher cost operating mode (e.g., deep sleep) to a lower cost operating mode (e.g., powered on), or may transition from a lower cost operating mode (e.g., lower traffic volume) to a higher cost operating mode (e.g., higher traffic volume). Similarly, the serving node 710 may transition from a higher cost operating mode (e.g., higher traffic volume) to a lower cost operating mode (e.g., lower traffic volume), or may transition from a lower cost operating mode (e.g., powered on) to a higher cost operating mode (e.g., deep sleep).

Although the serving node 710 is described above as performing operations in association with a handover procedure, in some aspects, one or more of these operations may be performed by a control node. For example, the serving node 710 may identify one or more neighbor nodes indicated in the measurement report for which a corresponding one or more cost parameters satisfies a condition (e.g., a cost below a threshold). The serving node 710 may identify one or more control nodes associated with the one or more neighbor nodes, and may transmit an indication of the one or more neighbor nodes to the one or more control nodes. In this case, the one or more control nodes may analyze measurements and/or cost parameters for the neighbor nodes, and may select a neighbor node as a target node for handover in a similar manner as described above (e.g., which may involve communication between multiple control nodes). In some aspects, the serving node 710 may filter out one or more nodes prior to transmitting measurements and/or cost parameters to the control node. In some aspects, the serving node 710 may identify a control node associated with the serving node (e.g., a parent node, a CU, and/or the like), and may indicate the one or more neighbor nodes to that control node. The control node may receive a cost parameter for a node from the serving node 710 or from the node, as described elsewhere herein.

In this way, the child node 705, the serving node 710, and/or a control node may account for operating modes of neighbor nodes when performing a handover procedure and/or a cell selection procedure (e.g., including a cell reselection procedure), thereby improving performance of the IAB network.

As indicated above, FIG. 9 is provided as an example. Other examples may differ from what is described with regard to FIG. 9.

Figure 10:
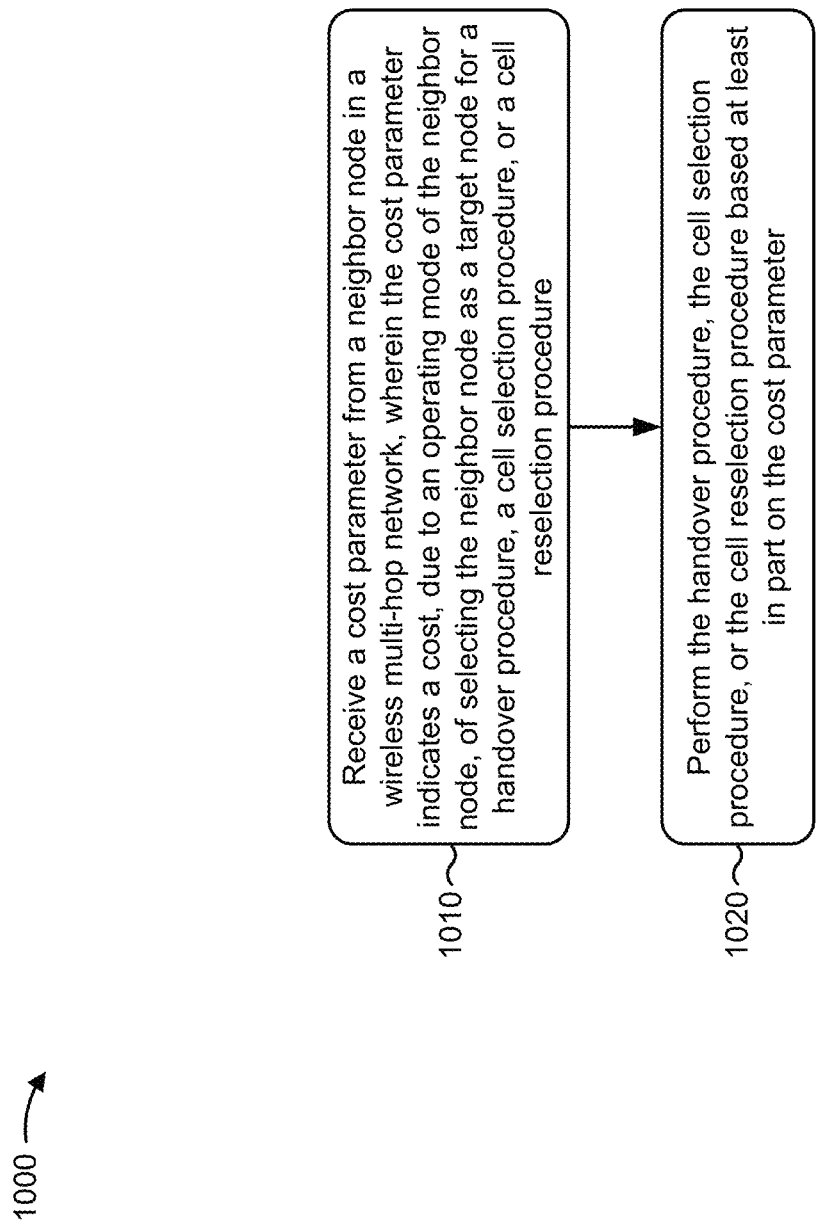
FIGS. 10-13 are diagrams illustrating example processes relating to selecting a neighbor node in a wireless multi-hop network using a cost parameter, in accordance with various aspects of the present disclosure.

FIG. 10 is a diagram illustrating an example process 1000 performed, for example, by a child node, in accordance with various aspects of the present disclosure. Example process 1000 is an example where a child node (e.g., an IAB node 410, a child node 505, a child node 705, a UE 120, a base station 110, and/or the like) performs operations associated with selecting a neighbor node in a wireless multi-hop network using a cost parameter.

As shown in FIG. 10, in some aspects, process 1000 may include receiving a cost parameter from a neighbor node in the wireless multi-hop network, wherein the cost parameter indicates a cost, due to an operating mode of the neighbor node, of selecting the neighbor node as a target node for a handover procedure, a cell selection procedure, or a cell reselection procedure (block 1010). For example, the child node (e.g., using antenna 234, DEMOD 232, MIMO detector 236, receive processor 238, controller/processor 240, memory 242, antenna 252, DEMOD 254, MIMO detector 256, receive processor 258, controller/processor 280, memory 282, and/or the like) may receive a cost parameter from a neighbor node in the wireless multi-hop network, as described above. In some aspects, the cost parameter indicates a cost, due to an operating mode of the neighbor node, of selecting the neighbor node as a target node for a handover procedure, a cell selection procedure, or a cell reselection procedure.

As further shown in FIG. 10, in some aspects, process 1000 may include performing the handover procedure, the cell selection procedure, or the cell reselection procedure based at least in part on the cost parameter (block 1020). For example, the child node (e.g., using transmit processor 220, receive processor 238, controller/processor 240, memory 242, receive processor 258, transmit processor 264, controller/processor 280, memory 282, and/or the like) may perform the handover procedure, the cell selection procedure, or the cell reselection procedure based at least in part on the cost parameter, as described above.

Process 1000 may include additional aspects, such as any single aspect or any combination of aspects described below and/or in connection with one or more other processes described elsewhere herein.

In a first aspect, performing the handover procedure comprises transmitting, to a serving node that serves the child node in the wireless multi-hop network, a measurement report based at least in part on the cost parameter.

In a second aspect, alone or in combination with the first aspect, the measurement report includes the cost parameter for the neighbor node.

In a third aspect, alone or in combination with one or more of the first and second aspects, the measurement report includes a set of cost parameters for a corresponding set of neighbor nodes.

In a fourth aspect, alone or in combination with one or more of the first through third aspects, performing the handover procedure further comprises: determining that the cost parameter for the neighbor node satisfies a condition; and indicating one or more measurements for the neighbor node in the measurement report based at least in part on determining that the cost parameter for the neighbor node satisfies the condition.

In a fifth aspect, alone or in combination with one or more of the first through fourth aspects, the measurement report includes measurements for one or more neighbor nodes for which a corresponding one or more cost parameters satisfy a condition.

In a sixth aspect, alone or in combination with one or more of the first through fifth aspects, performing the cell selection procedure or the cell reselection procedure comprises prioritizing the neighbor node for the cell selection procedure or the cell reselection procedure based at least in part on the cost parameter.

In a seventh aspect, alone or in combination with one or more of the first through sixth aspects, the cost parameter is received via at least one of: a synchronization signal block, a physical broadcast channel, a system information block, remaining minimum system information, a channel state information reference signal, or a combination thereof.

In an eighth aspect, alone or in combination with one or more of the first through seventh aspects, the cost parameter is based at least in part on at least one of: the operating mode of the neighbor node, a power saving mode of the neighbor node, a power status of the neighbor node, a hop count associated with the neighbor node, an operating mode or a power status of one or more other nodes included in a route from the neighbor node to a central unit of the wireless multi-hop network, a time at which the neighbor node is available to serve the child node, a priority of selecting the neighbor node as the target node as compared to one or more other neighbor nodes, or a combination thereof.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
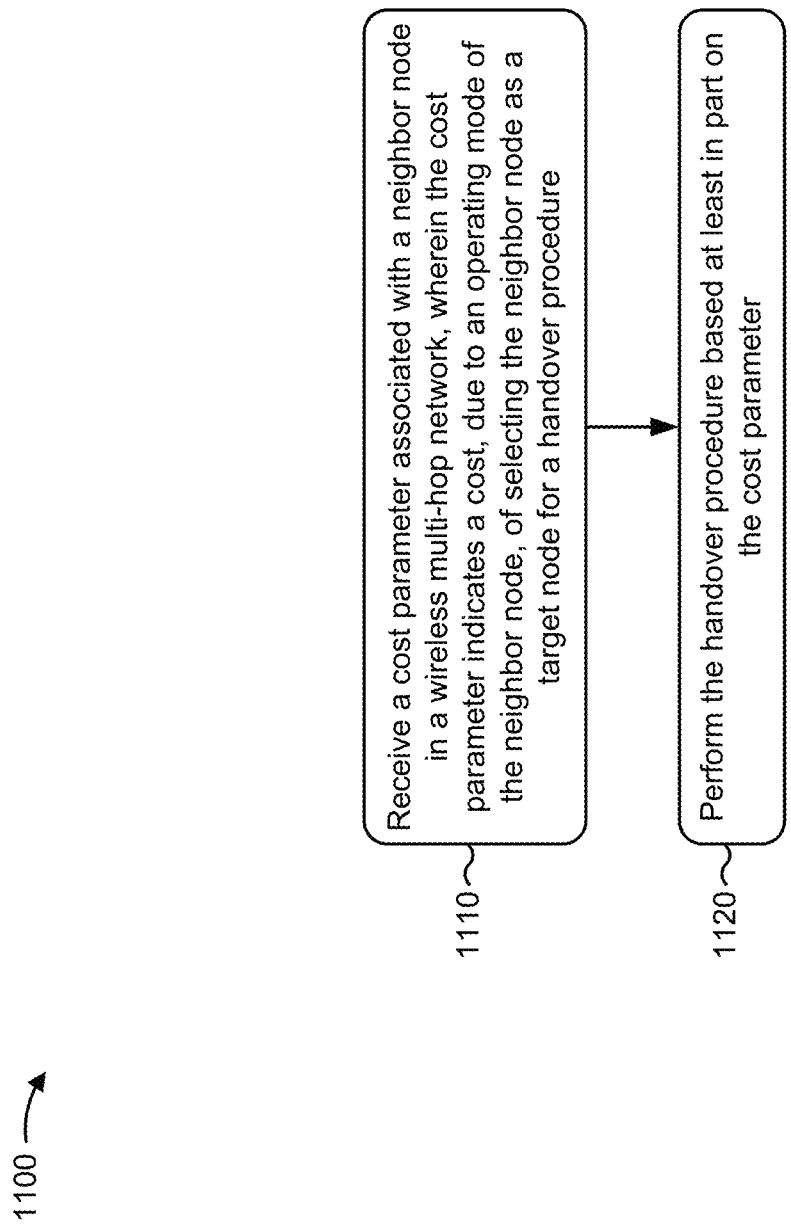

FIG. 11 is a diagram illustrating an example process 1100 performed, for example, by a serving node, in accordance with various aspects of the present disclosure. Example process 1100 is an example where a serving node (e.g., an IAB node 410, an IAB donor 405, a serving node 510, a serving node 605, a serving node 710, a base station 110, and/or the like) performs operations associated with selecting a neighbor node in a wireless multi-hop network using a cost parameter.

As shown in FIG. 11, in some aspects, process 1100 may include receiving a cost parameter associated with a neighbor node in the wireless multi-hop network, wherein the cost parameter indicates a cost, due to an operating mode of the neighbor node, of selecting the neighbor node as a target node for a handover procedure (block 1110). For example, the serving node (e.g., using antenna 234, DEMOD 232, MIMO detector 236, receive processor 238, controller/processor 240, memory 242, communication unit 294, controller/processor 290, memory 292, and/or the like) may receive a cost parameter associated with a neighbor node in the wireless multi-hop network, as described above. In some aspects, the cost parameter indicates a cost, due to an operating mode of the neighbor node, of selecting the neighbor node as a target node for a handover procedure.

As further shown in FIG. 11, in some aspects, process 1100 may include performing the handover procedure based at least in part on the cost parameter (block 1120). For example, the serving node (e.g., using antenna 234, DEMOD 232, MIMO detector 236, receive processor 238, controller/processor 240, memory 242, transmit processor 220, TX MIMO processor 230, MOD 232, communication unit 294, controller/processor 290, memory 292, and/or the like) may perform the handover procedure based at least in part on the cost parameter, as described above.

Process 1100 may include additional aspects, such as any single aspect or any combination of aspects described below and/or in connection with one or more other processes described elsewhere herein.

In a first aspect, the cost parameter is received from a child node, of the serving node, in a measurement report.

In a second aspect, alone or in combination with the first aspect, the cost parameter is received from the neighbor node.

In a third aspect, alone or in combination with one or more of the first and second aspects, performing the handover procedure comprises selecting the neighbor node, from a set of neighbor nodes, as the target node for the handover procedure based at least in part on the cost parameter.

In a fourth aspect, alone or in combination with one or more of the first through third aspects, performing the handover procedure further comprises: determining that the cost parameter for the neighbor node satisfies a condition; and performing the handover procedure based at least in part on determining that the cost parameter for the neighbor node satisfies the condition.

In a fifth aspect, alone or in combination with one or more of the first through fourth aspects, the cost parameter is received via at least one of: a measurement report, a synchronization signal block, a physical broadcast channel, a system information block, remaining minimum system information, a channel state information reference signal, or a combination thereof.

In a sixth aspect, alone or in combination with one or more of the first through fifth aspects, the cost parameter is based at least in part on at least one of: the operating mode of the neighbor node, a power saving mode of the neighbor node, a power status of the neighbor node, a hop count associated with the neighbor node, an operating mode or a power status of one or more other nodes included in a route from the neighbor node to a central unit of the wireless multi-hop network, a time at which the neighbor node is available to serve a child node, a priority of selecting the neighbor node as the target node as compared to one or more other neighbor nodes, or a combination thereof.

In a seventh aspect, alone or in combination with one or more of the first through sixth aspects, performing the handover procedure further comprises: identifying one or more neighbor nodes for which a corresponding one or more cost parameters satisfy a condition; identifying at least one control node associated with the one or more neighbor nodes; and transmitting an indication of the one or more neighbor nodes to the at least one control node for the handover procedure.

In an eighth aspect, alone or in combination with one or more of the first through seventh aspects, performing the handover procedure further comprises: identifying one or more neighbor nodes for which a corresponding one or more cost parameters satisfy a condition; and transmitting an indication of the one or more neighbor nodes to a control node associated with the serving node.

In a ninth aspect, alone or in combination with one or more of the first through eighth aspects, the control node is the serving node, another node in the wireless multi-hop network, or a central unit in the wireless multi-hop network.

In a tenth aspect, alone or in combination with one or more of the first through ninth aspects, process 1100 includes modifying an operating mode of the serving node after the handover procedure is complete.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
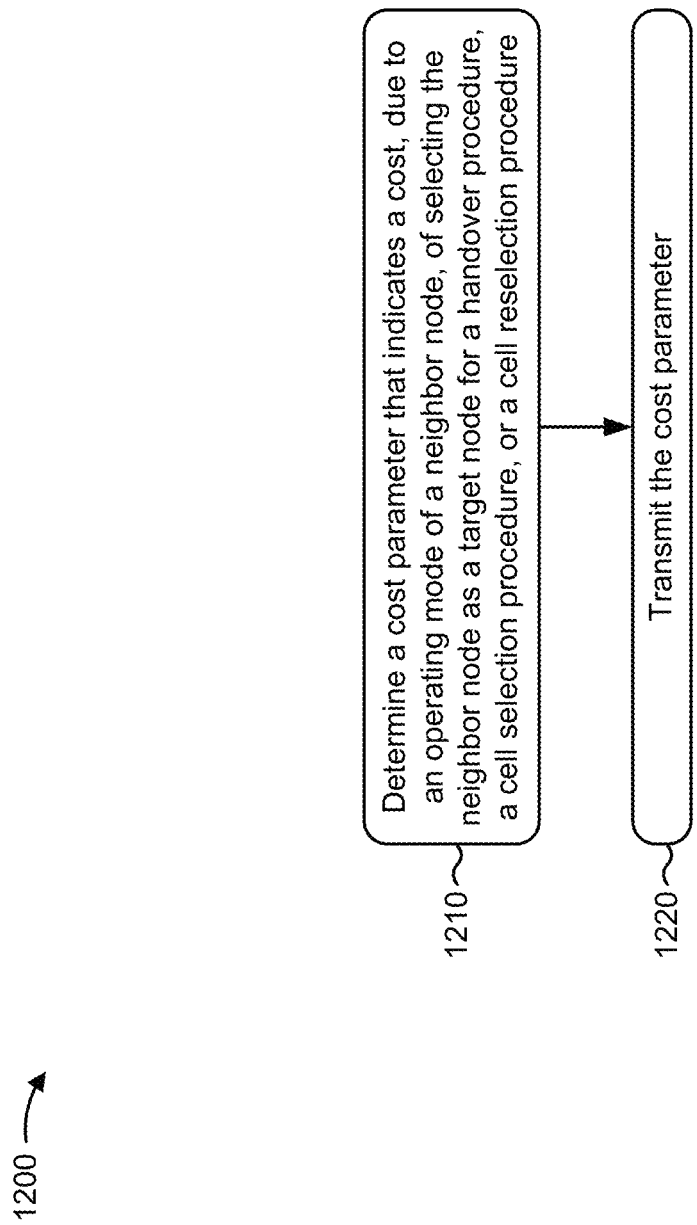

FIG. 12 is a diagram illustrating an example process 1200 performed, for example, by a neighbor node, in accordance with various aspects of the present disclosure. Example process 1200 is an example where a neighbor node (e.g., an IAB node 410, a target node 515, a neighbor node 610-630, a neighbor node 715-725, a base station 110, and/or the like) performs operations associated with selecting a neighbor node in a wireless multi-hop network using a cost parameter.

As shown in FIG. 12, in some aspects, process 1200 may include determining a cost parameter that indicates a cost, due to an operating mode of the neighbor node, of selecting the neighbor node as a target node for a handover procedure, a cell selection procedure, or a cell reselection procedure (block 1210). For example, the neighbor node (e.g., using antenna 234, DEMOD 232, MIMO detector 236, receive processor 238, controller/processor 240, memory 242, transmit processor 220, TX MIMO processor 230, MOD 232, and/or the like) may determine a cost parameter that indicates a cost, due to an operating mode of the neighbor node, of selecting the neighbor node as a target node for a handover procedure, a cell selection procedure, or a cell reselection procedure, as described above.

As further shown in FIG. 12, in some aspects, process 1200 may include transmitting the cost parameter (block 1220). For example, the neighbor node (e.g., using controller/processor 240, memory 242, transmit processor 220, TX MIMO processor 230, MOD 232, antenna 234, and/or the like) may transmit the cost parameter, as described above.

Process 1200 may include additional aspects, such as any single aspect or any combination of aspects described below and/or in connection with one or more other processes described elsewhere herein.

In a first aspect, the cost parameter is transmitted via at least one of: a synchronization signal block, a physical broadcast channel, a system information block, remaining minimum system information, a channel state information reference signal, or a combination thereof.

In a second aspect, alone or in combination with the first aspect, the cost parameter is based at least in part on at least one of: the operating mode of the neighbor node, a power saving mode of the neighbor node, a power status of the neighbor node, a hop count associated with the neighbor node, an operating mode or a power status of one or more other nodes included in a route from the neighbor node to a central unit of the wireless multi-hop network, a time at which the neighbor node is available to serve a child node, a priority of selecting the neighbor node as the target node as compared to one or more other neighbor nodes, or a combination thereof.

In a third aspect, alone or in combination with one or more of the first and second aspects, the cost parameter is transmitted based at least in part on a determination that the operating mode of the neighbor node satisfies a condition.

In a fourth aspect, alone or in combination with one or more of the first through third aspects, the cost parameter is configured by the neighbor node and transmitted to a central unit in the wireless multi-hop network.

In a fifth aspect, alone or in combination with one or more of the first through fourth aspects, the cost parameter is configured by a central unit in the wireless multi-hop network.

In a sixth aspect, alone or in combination with one or more of the first through fifth aspects, the cost parameter is determined based at least in part on detecting at least one of: a change in the operating mode of the neighbor node, a change in an operating mode of another node associated with the neighbor node, a change in a power status of the neighbor node or of another node associated with the neighbor node, a change in network topology, or a combination thereof.

In a seventh aspect, alone or in combination with one or more of the first through sixth aspects, the cost parameter is updated periodically, transmitted periodically, or a combination thereof.

In an eighth aspect, alone or in combination with one or more of the first through seventh aspects, process 1200 includes modifying an operating mode of the neighbor node after completion of the handover procedure, the cell selection procedure, or the cell reselection procedure.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
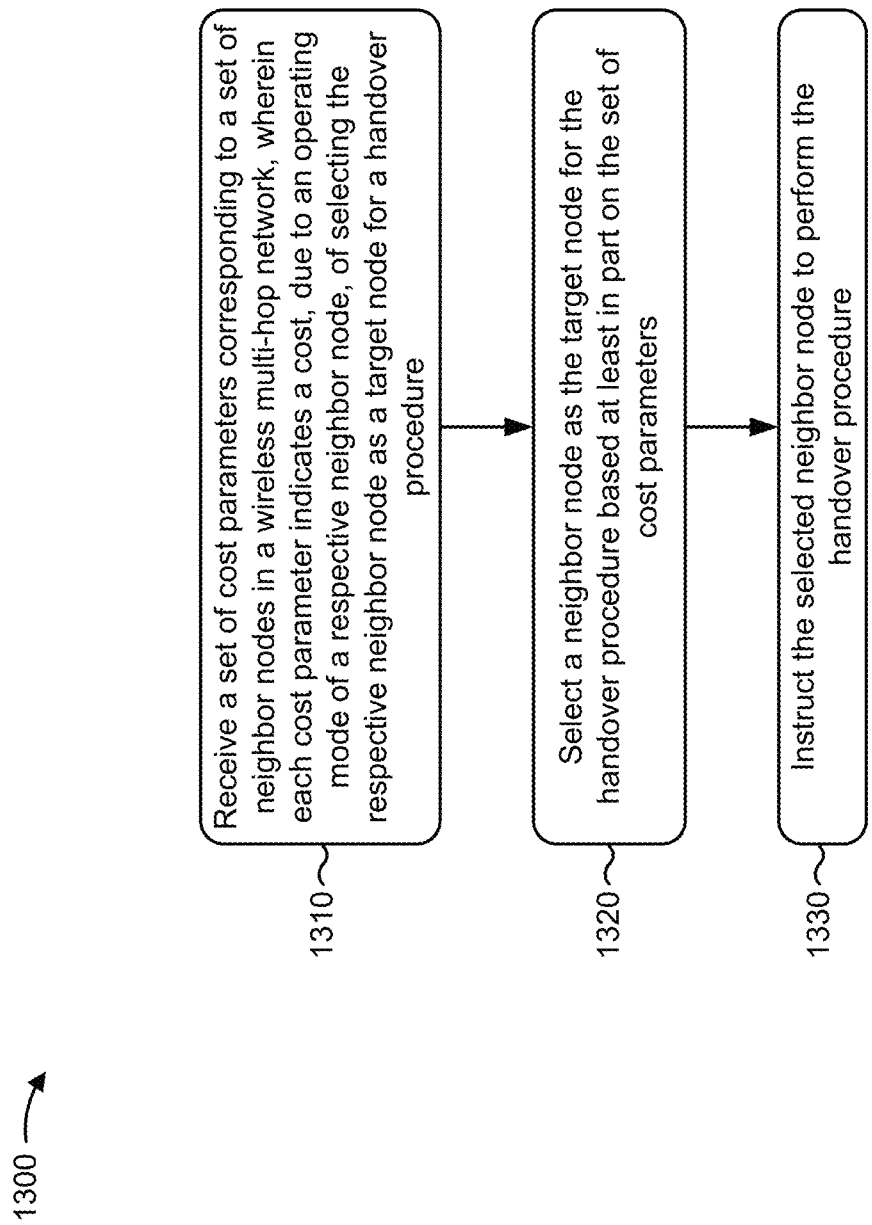

FIG. 13 is a diagram illustrating an example process 1300 performed, for example, by a control node, in accordance with various aspects of the present disclosure. Example process 1300 is an example where a control node (e.g., an IAB donor 405, an IAB node 410, a serving node 510, a control node 520, a serving node 605, a serving node 710, a control node 730-735, a base station 110, and/or the like) performs operations associated with selecting a neighbor node in a wireless multi-hop network using a cost parameter.

As shown in FIG. 13, in some aspects, process 1300 may include receiving a set of cost parameters corresponding to a set of neighbor nodes in the wireless multi-hop network, wherein each cost parameter indicates a cost, due to an operating mode of a respective neighbor node, of selecting the respective neighbor node as a target node for a handover procedure (block 1310). For example, the control node (e.g., using antenna 234, DEMOD 232, MIMO detector 236, receive processor 238, controller/processor 240, memory 242, communication unit 294, controller/processor 290, memory 292, and/or the like) may receive a set of cost parameters corresponding to a set of neighbor nodes in the wireless multi-hop network, as described above. In some aspects, each cost parameter indicates a cost, due to an operating mode of a respective neighbor node, of selecting the respective neighbor node as a target node for a handover procedure.

As further shown in FIG. 13, in some aspects, process 1300 may include selecting a neighbor node, of the set of neighbor nodes, as the target node for the handover procedure based at least in part on the set of cost parameters (block 1320). For example, the control node (e.g., using controller/processor 240, memory 242, controller/processor 290, memory 292, and/or the like) may select a neighbor node, of the set of neighbor nodes, as the target node for the handover procedure based at least in part on the set of cost parameters, as described above.

As further shown in FIG. 13, in some aspects, process 1300 may include instructing the selected neighbor node to perform the handover procedure (block 1330). For example, the control node (e.g., using controller/processor 240, memory 242, transmit processor 220, TX MIMO processor 230, MOD 232, antenna 234, communication unit 294, controller/processor 290, memory 292, and/or the like) may instruct the selected neighbor node to perform the handover procedure, as described above.

Process 1300 may include additional aspects, such as any single aspect or any combination of aspects described below and/or in connection with one or more other processes described elsewhere herein.

In a first aspect, at least one cost parameter, of the set of cost parameters, is received via at least one of: a measurement report, a synchronization signal block, a physical broadcast channel, a system information block, remaining minimum system information, a channel state information reference signal, or a combination thereof.

In a second aspect, alone or in combination with the first aspect, a cost parameter, of the set of cost parameters, is based at least in part on at least one of: the operating mode of the neighbor node, a power saving mode of the neighbor node, a power status of the neighbor node, a hop count associated with the neighbor node, an operating mode or a power status of one or more other nodes included in a route from the neighbor node to a central unit of the wireless multi-hop network, a time at which the neighbor node is available to serve a child node, a priority of selecting the neighbor node as the target node as compared to one or more other neighbor nodes, or a combination thereof.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
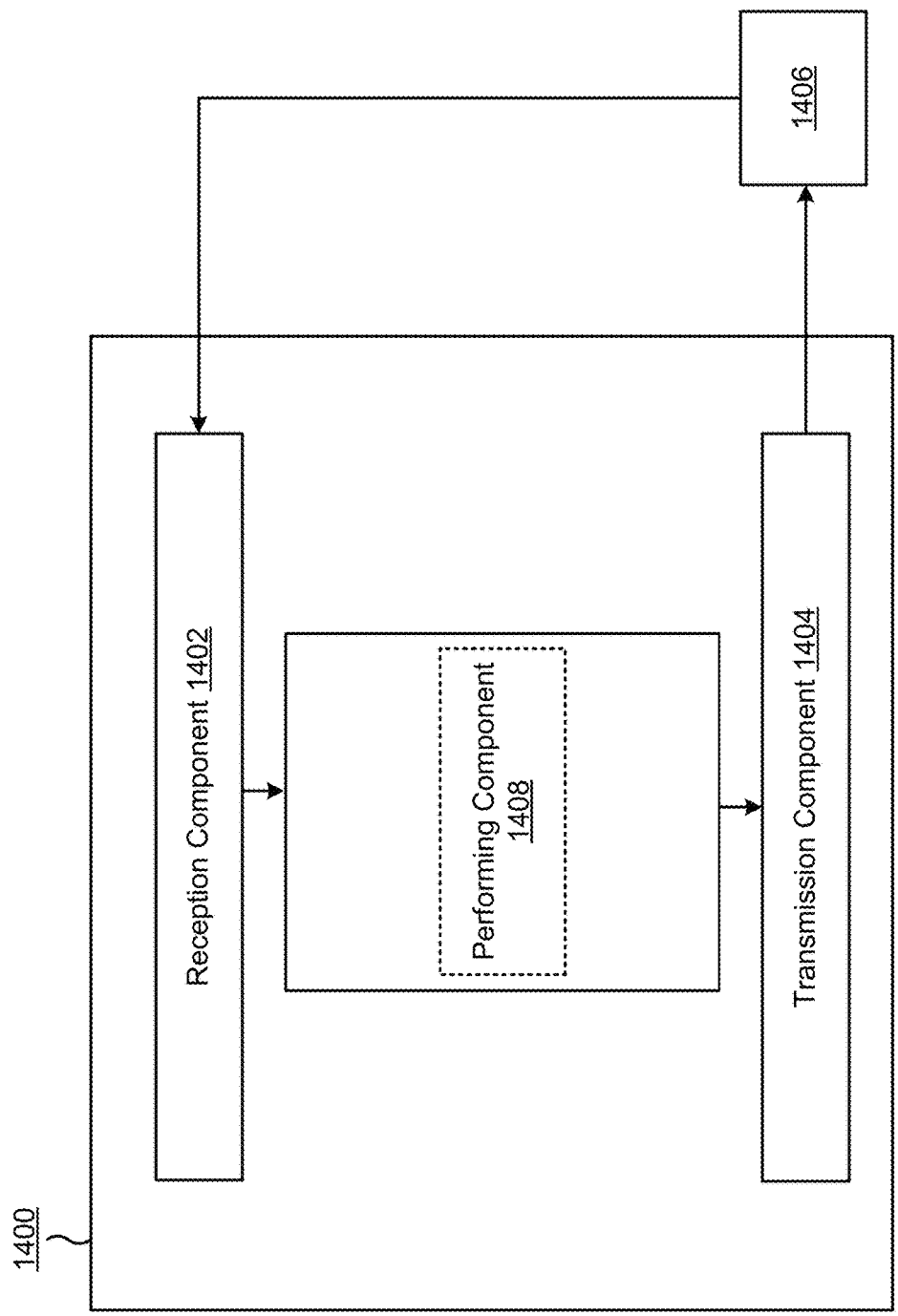
FIGS. 14-17 are block diagrams of example apparatuses for wireless communication, in accordance with various aspects of the present disclosure.

FIG. 14 is a block diagram of an example apparatus 1400 for wireless communication, in accordance with various aspects of the present disclosure. The apparatus 1400 may be a child node, or a child node may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a performing component 1408, among other examples.

In some aspects, the apparatus 1400 may be configured to perform one or more operations described herein in connection with FIGS. 7-9. Additionally or alternatively, the apparatus 1400 may be configured to perform one or more processes described herein, such as process 1000 of FIG. 10. In some aspects, the apparatus 1400 and/or one or more components shown in FIG. 14 may include one or more components of the UE described above in connection with FIG. 2. Additionally, or alternatively, one or more components shown in FIG. 14 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the UE described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the UE described above in connection with FIG. 2. In some aspects, the transmission component 1404 may be collocated with the reception component 1402 in a transceiver.

The reception component 1402 may receive a cost parameter from a neighbor node in the wireless multi-hop network, wherein the cost parameter indicates a cost, due to an operating mode of the neighbor node, of selecting the neighbor node as a target node for a handover procedure, a cell selection procedure, or a cell reselection procedure. The performing component 1408 may perform the handover procedure, the cell selection procedure, or the cell reselection procedure based at least in part on the cost parameter.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

Figure 15:
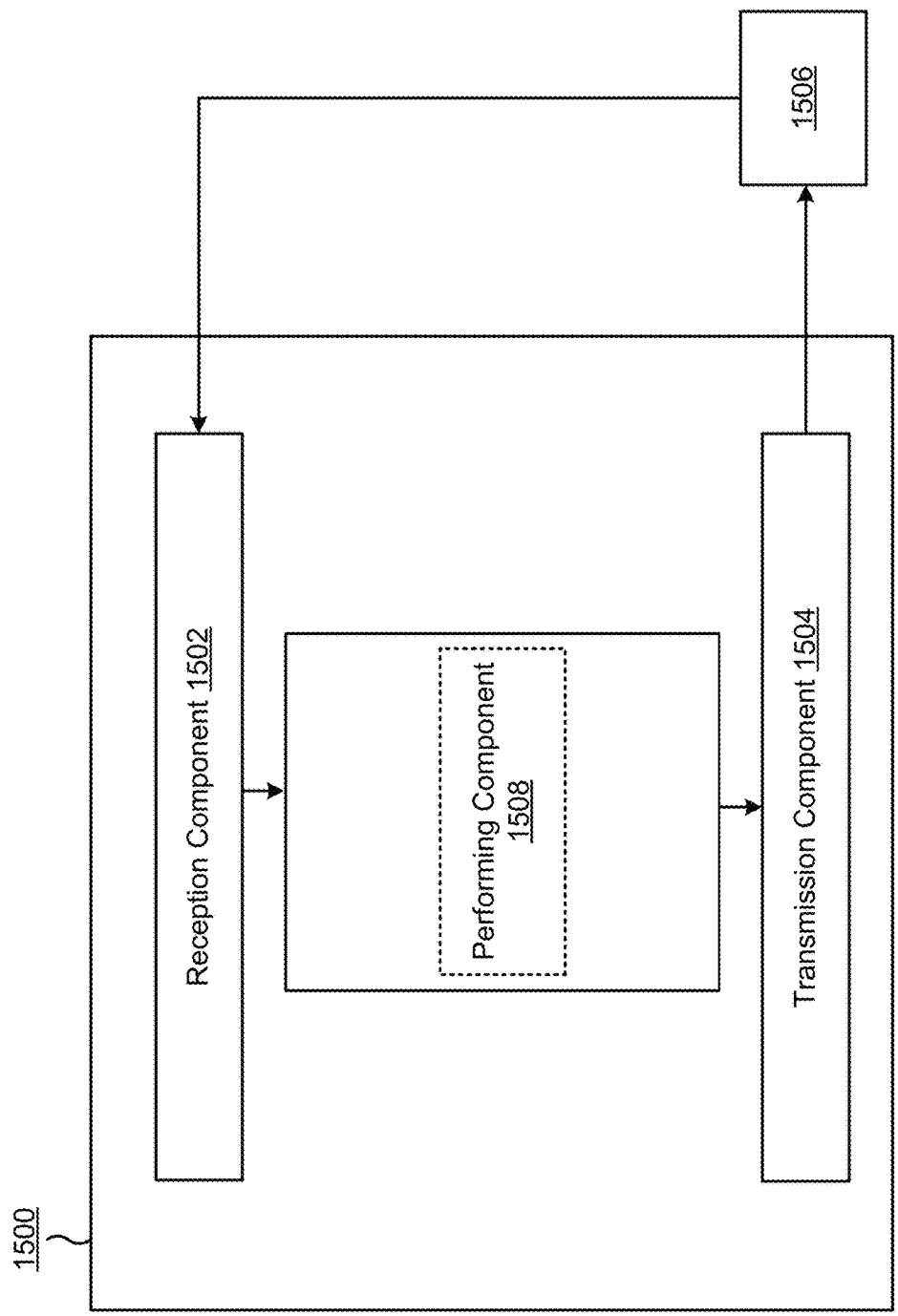

FIG. 15 is a block diagram of an example apparatus 1500 for wireless communication, in accordance with various aspects of the present disclosure. The apparatus 1500 may be a serving node, or a serving node may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include a performing component 1508, among other examples.

In some aspects, the apparatus 1500 may be configured to perform one or more operations described herein in connection with FIGS. 7-9. Additionally or alternatively, the apparatus 1500 may be configured to perform one or more processes described herein, such as process 1100 of FIG. 11. In some aspects, the apparatus 1500 and/or one or more components shown in FIG. 15 may include one or more components of the base station described above in connection with FIG. 2. Additionally, or alternatively, one or more components shown in FIG. 15 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the base station described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the base station described above in connection with FIG. 2. In some aspects, the transmission component 1504 may be collocated with the reception component 1502 in a transceiver.

The reception component 1502 may receive a cost parameter associated with a neighbor node in the wireless multi-hop network, wherein the cost parameter indicates a cost, due to an operating mode of the neighbor node, of selecting the neighbor node as a target node for a handover procedure. The performing component 1508 may perform the handover procedure based at least in part on the cost parameter.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally or alternatively, a set of (one or more) components shown in FIG. 15 may perform one or more functions described as being performed by another set of components shown in FIG. 15.

Figure 16:
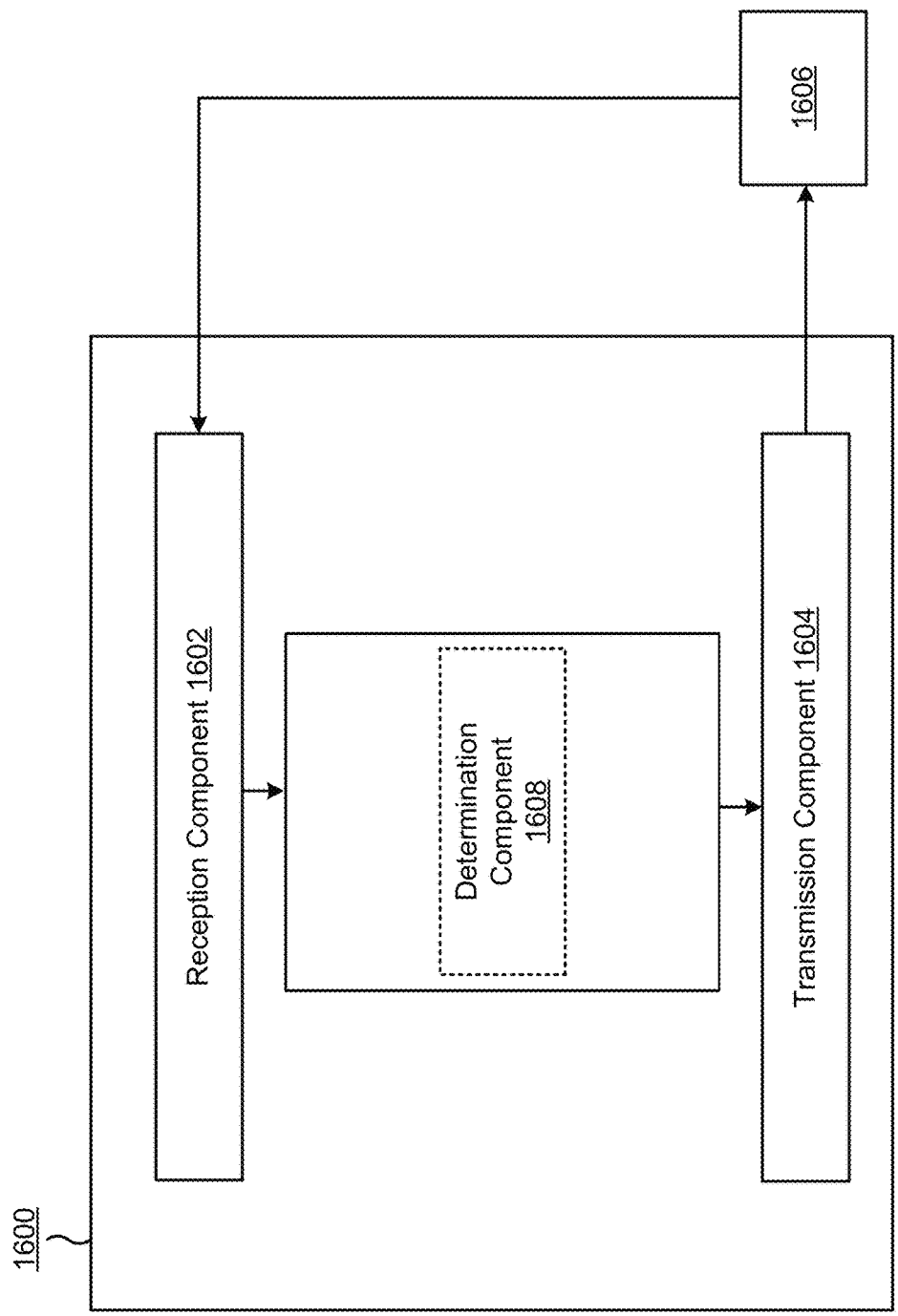

FIG. 16 is a block diagram of an example apparatus 1600 for wireless communication, in accordance with various aspects of the present disclosure. The apparatus 1600 may be a neighbor node, or a neighbor node may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include a determination component 1608, among other examples.

In some aspects, the apparatus 1600 may be configured to perform one or more operations described herein in connection with FIGS. 7-9. Additionally or alternatively, the apparatus 1600 may be configured to perform one or more processes described herein, such as process 1200 of FIG. 12. In some aspects, the apparatus 1600 and/or one or more components shown in FIG. 16 may include one or more components of the base station described above in connection with FIG. 2. Additionally, or alternatively, one or more components shown in FIG. 16 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the base station described above in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the base station described above in connection with FIG. 2. In some aspects, the transmission component 1604 may be collocated with the reception component 1602 in a transceiver.

The determination component 1608 may determine a cost parameter that indicates a cost, due to an operating mode of the neighbor node, of selecting the neighbor node as a target node for a handover procedure, a cell selection procedure, or a cell reselection procedure. The transmission component 1604 may transmit the cost parameter.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally or alternatively, a set of (one or more) components shown in FIG. 16 may perform one or more functions described as being performed by another set of components shown in FIG. 16.

Figure 17:
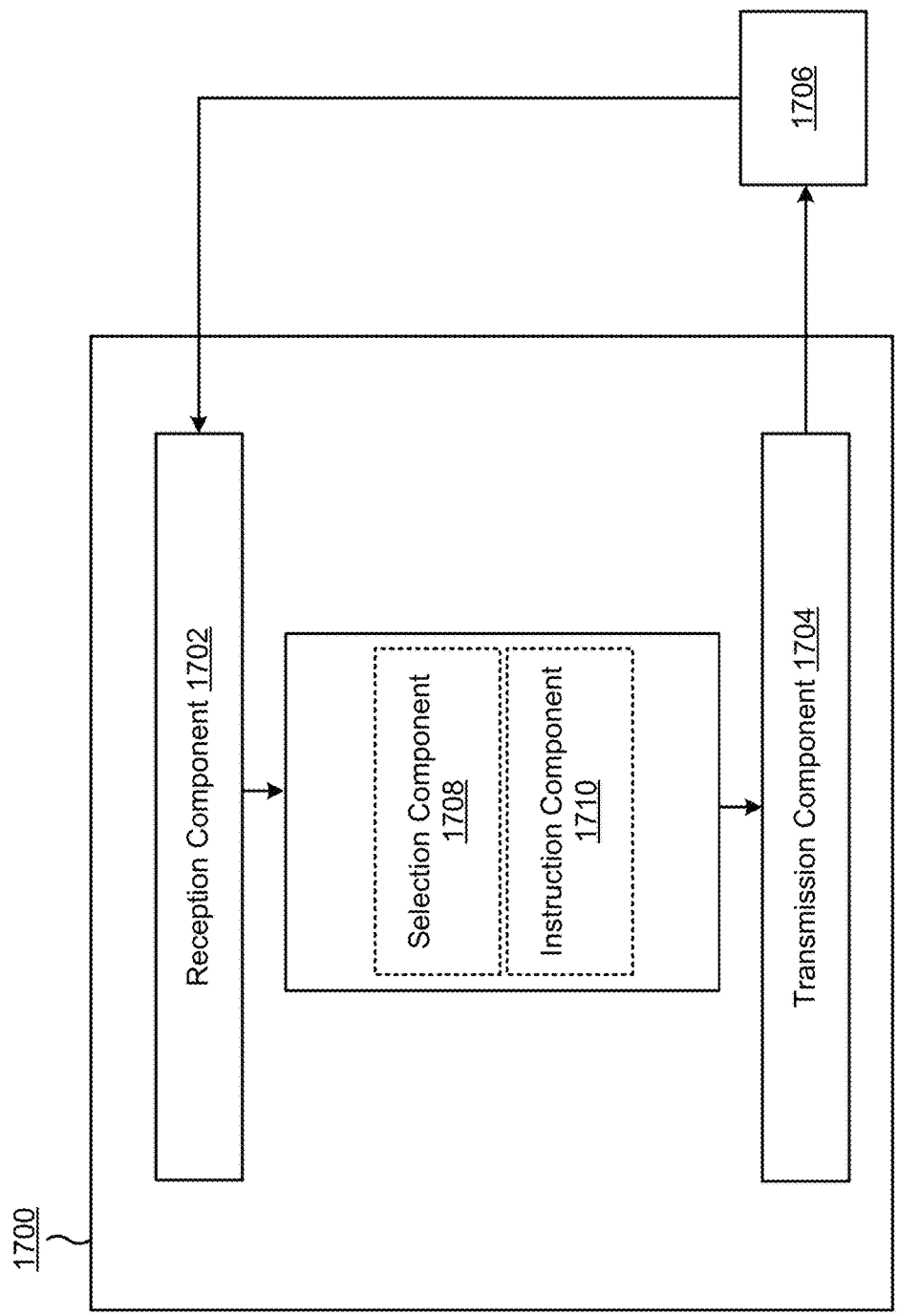

FIG. 17 is a block diagram of an example apparatus 1700 for wireless communication, in accordance with various aspects of the present disclosure. The apparatus 1700 may be a control node, or a control node may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include one or more of a selection component 1708 or an instruction component 1710, among other examples.

In some aspects, the apparatus 1700 may be configured to perform one or more operations described herein in connection with FIGS. 7-9. Additionally or alternatively, the apparatus 1700 may be configured to perform one or more processes described herein, such as process 1300 of FIG. 13. In some aspects, the apparatus 1700 and/or one or more components shown in FIG. 17 may include one or more components of the base station described above in connection with FIG. 2. Additionally, or alternatively, one or more components shown in FIG. 17 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1706. In some aspects, the reception component 1702 may include one or more antennas, a demodulator, a MIMO detector, a receive processor, a controller/processor, a memory, or a combination thereof, of the base station described above in connection with FIG. 2.

The transmission component 1704 may transmit communications, such as reference signals, control information, data communications, or a combination thereof, to the apparatus 1706. In some aspects, one or more other components of the apparatus 1706 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modulator, a transmit MIMO processor, a transmit processor, a controller/processor, a memory, or a combination thereof, of the base station described above in connection with FIG. 2. In some aspects, the transmission component 1704 may be collocated with the reception component 1702 in a transceiver.

The reception component 1702 may receive a set of cost parameters corresponding to a set of neighbor nodes in the wireless multi-hop network, wherein each cost parameter indicates a cost, due to an operating mode of a respective neighbor node, of selecting the respective neighbor node as a target node for a handover procedure. The selection component 1708 may select a neighbor node, of the set of neighbor nodes, as the target node for the handover procedure based at least in part on the set of cost parameters. The instruction component 1710 may instruct the selected neighbor node to perform the handover procedure.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally or alternatively, a set of (one or more) components shown in FIG. 17 may perform one or more functions described as being performed by another set of components shown in FIG. 17.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a child node in a wireless network, comprising:
receiving a plurality of cost parameters associated with a plurality of neighbor nodes in the wireless network,
wherein each cost parameter, of the plurality of cost parameters, indicates a cost, due to an operating mode of a neighbor node of the plurality of neighbor nodes, of selecting the neighbor node as a target node for a handover procedure, a cell selection procedure, or a cell reselection procedure, and
wherein the operating mode of the neighbor node indicates an energy consumption state of the neighbor node; and
performing the handover procedure, the cell selection procedure, or the cell reselection procedure based at least in part on a cell priority list, associated with the plurality of neighbor nodes, and the plurality of cost parameters.

2. The method of claim 1, wherein performing the handover procedure comprises transmitting, to a serving node that serves the child node in the wireless network, a measurement report based at least in part on the plurality of cost parameters.

3. The method of claim 2, wherein the measurement report includes one or more cost parameters, of the plurality of cost parameters, for one or more neighbor nodes of the plurality of neighbor nodes.

4. The method of claim 2, wherein the measurement report includes the plurality of cost parameters for the plurality of neighbor nodes.

5. The method of claim 2, wherein performing the handover procedure further comprises:
determining that a cost parameter, of the plurality of cost parameters, for the neighbor node satisfies a condition; and
indicating one or more measurements for the neighbor node in the measurement report based at least in part on determining that the cost parameter for the neighbor node satisfies the condition.

6. The method of claim 2, wherein the measurement report includes one or more measurements for one or more neighbor nodes, of the plurality of neighbor nodes, for which a corresponding one or more cost parameters, of the plurality of cost parameters, satisfy a condition.

7. The method of claim 1, wherein performing the cell selection procedure or the cell reselection procedure comprises prioritizing the neighbor node for the cell selection procedure or the cell reselection procedure based at least in part on the cell priority list and the plurality of cost parameters.

8. The method of claim 1, wherein at least one cost parameter, of the plurality of cost parameters, is received via at least one of:
a synchronization signal block,
a physical broadcast channel,
a system information block,
remaining minimum system information,
a channel state information reference signal, or
a combination thereof.

9. The method of claim 1, wherein at least one cost parameter, of the plurality of cost parameters, is based at least in part on at least one of:
the operating mode of the neighbor node,
a power saving mode of the neighbor node,
a power status of the neighbor node,
a hop count associated with the neighbor node,
an operating mode or a power status of one or more other nodes included in a route from the neighbor node to a central unit of the wireless network,
a time at which the neighbor node is available to serve the child node,
a priority of selecting the neighbor node as the target node as compared to one or more other neighbor nodes, or
a combination thereof.

10. A child node for wireless communication, comprising:
a memory; and
one or more processors, coupled to the memory, configured to:
receive a plurality of cost parameters associated with a plurality of neighbor nodes in a wireless network,
wherein each cost parameter, of the plurality of cost parameters, indicates a cost, due to an operating mode of a neighbor node of the plurality of neighbor nodes, of selecting the neighbor node as a target node for a handover procedure, a cell selection procedure, or a cell reselection procedure, and
wherein the operating mode of the neighbor node indicates an energy consumption state of the neighbor node; and
perform the handover procedure, the cell selection procedure, or the cell reselection procedure based at least in part on a cell priority list, associated with the plurality of neighbor nodes, and the plurality of cost parameters.

11. The child node of claim 10, wherein the one or more processors, to perform the handover procedure, are configured to transmit, to a serving node that serves the child node in the wireless network, a measurement report based at least in part on the plurality of cost parameters.

12. The child node of claim 11, wherein the measurement report includes one or more cost parameters, of the plurality of cost parameters, for one or more neighbor nodes of the plurality of neighbor nodes.

13. The child node of claim 11, wherein the measurement report includes the plurality of cost parameters for the plurality of neighbor nodes.

14. The child node of claim 11, wherein the one or more processors, to perform the handover procedure, are configured to:
determine that a cost parameter, of the plurality of cost parameters, for a neighbor node, of the plurality of neighbor nodes, satisfies a condition; and
indicate one or more measurements for the neighbor node in the measurement report based at least in part on determining that the cost parameter for the neighbor node satisfies the condition.

15. The child node of claim 11, wherein the measurement report includes one or more measurements for one or more neighbor nodes, of the plurality of neighbor nodes, for which a corresponding one or more cost parameters, of the plurality of cost parameters, satisfy a condition.

16. The child node of claim 10, wherein the one or more processors, to perform the cell selection procedure or the cell reselection procedure, are configured to prioritize the neighbor node for the cell selection procedure or the cell reselection procedure based at least in part on the cell priority list and the plurality of cost parameters.

17. The child node of claim 10, wherein at least one cost parameter, of the plurality of cost parameters, is received via at least one of:
a synchronization signal block,
a physical broadcast channel,
a system information block,
remaining minimum system information,
a channel state information reference signal, or
a combination thereof.

18. The child node of claim 10, wherein at least one cost parameter, of the plurality of cost parameters, is based at least in part on at least one of:
the operating mode of the neighbor node,
a power saving mode of the neighbor node,
a power status of the neighbor node,
a hop count associated with the neighbor node,
an operating mode or a power status of one or more other nodes included in a route from the neighbor node to a central unit of the wireless network,
a time at which the neighbor node is available to serve the child node,
a priority of selecting the neighbor node as the target node as compared to one or more other neighbor nodes, or
a combination thereof.

19. A non-transitory computer-readable medium storing a set of instructions for wireless communication, the set of instructions comprising:
one or more instructions that, when executed by one or more processors of a child node, cause the child node to:
receive a plurality of cost parameters associated with a plurality of neighbor nodes in a wireless network,
wherein each cost parameter, of the plurality of cost parameters, indicates a cost, due to an operating mode of a neighbor node of the plurality of neighbor nodes, of selecting the neighbor node as a target node for a handover procedure, a cell selection procedure, or a cell reselection procedure, and
wherein the operating mode of the neighbor node indicates an energy consumption state of the neighbor node; and
perform the handover procedure, the cell selection procedure, or the cell reselection procedure based at least in part on a cell priority list, associated with the plurality of neighbor nodes, and the plurality of cost parameters.

20. The non-transitory computer-readable medium of claim 19, wherein the one or more instructions, that cause the child node to perform the handover procedure, cause the child node to transmit, to a serving node that serves the child node in the wireless network, a measurement report based at least in part on the plurality of cost parameters.

21. The non-transitory computer-readable medium of claim 20, wherein the measurement report includes one or more cost parameters, of the plurality of cost parameters, for one or more neighbor nodes of the plurality of neighbor nodes.

22. The non-transitory computer-readable medium of claim 20, wherein the measurement report includes the plurality of cost parameters for the plurality of neighbor nodes.

23. The non-transitory computer-readable medium of claim 20, wherein the one or more instructions, that cause the child node to perform the handover procedure, cause the child node to:
determine that a cost parameter, of the plurality of cost parameters, for a neighbor node, of the plurality of neighbor nodes, satisfies a condition; and
indicate one or more measurements for the neighbor node in the measurement report based at least in part on determining that the cost parameter for the neighbor node satisfies the condition.

24. The non-transitory computer-readable medium of claim 20, wherein the measurement report includes one or more measurements for one or more neighbor nodes, of the plurality of neighbor nodes, for which a corresponding one or more cost parameters, of the plurality of cost parameters, satisfy a condition.

25. The non-transitory computer-readable medium of claim 19, wherein the one or more instructions, that cause the child node to perform the cell selection procedure or the cell reselection procedure, cause the child node to prioritize the neighbor node for the cell selection procedure or the cell reselection procedure based at least in part on the cell priority list and the plurality of cost parameters.

26. The non-transitory computer-readable medium of claim 19, wherein at least one cost parameter, of the plurality of cost parameters, is received via at least one of:
a synchronization signal block,
a physical broadcast channel,
a system information block,
remaining minimum system information,
a channel state information reference signal, or
a combination thereof.

27. The non-transitory computer-readable medium of claim 19, wherein at least one cost parameter, of the plurality of cost parameters, is based at least in part on at least one of:
the operating mode of the neighbor node,
a power saving mode of the neighbor node,
a power status of the neighbor node,
a hop count associated with the neighbor node,
an operating mode or a power status of one or more other nodes included in a route from the neighbor node to a central unit of the wireless network,
a time at which the neighbor node is available to serve the child node,
a priority of selecting the neighbor node as the target node as compared to one or more other neighbor nodes, or
a combination thereof.

28. An apparatus for wireless communication, comprising:
means for receiving a plurality of cost parameters associated with a plurality of neighbor nodes in a wireless network,
wherein each cost parameter, of the plurality of cost parameters, indicates a cost, due to an operating mode of a neighbor node of the plurality of neighbor nodes, of selecting the neighbor node as a target node for a handover procedure, a cell selection procedure, or a cell reselection procedure, and
wherein the operating mode of the neighbor node indicates an energy consumption state of the neighbor node; and
means for performing the handover procedure, the cell selection procedure, or the cell reselection procedure based at least in part on a cell priority list, associated with the plurality of neighbor nodes, and the plurality of cost parameters.

29. The apparatus of claim 28, wherein the means for performing the handover procedure comprises means for transmitting, to a serving node that serves the apparatus in the wireless network, a measurement report based at least in part on the plurality of cost parameters.

30. The apparatus of claim 28, wherein the measurement report includes one or more cost parameters, of the plurality of cost parameters, for one or more neighbor nodes of the plurality of neighbor nodes.

* * * * *